(12) United States Patent
Naganuma

(10) Patent No.: US 10,882,236 B2
(45) Date of Patent: Jan. 5, 2021

(54) MOLDING SYSTEM, MOLDING APPARATUS, INSPECTION APPARATUS, INSPECTION METHOD, AND PROGRAM

(71) Applicant: ASKA COMPANY, Kato (JP)

(72) Inventor: Tsuneo Naganuma, Kato (JP)

(73) Assignee: ASKA COMPANY, Kato (JP)

(*) Notice: Subject to any disclaimer, the term of this patent is extended or adjusted under 35 U.S.C. 154(b) by 0 days.

(21) Appl. No.: 16/603,974

(22) PCT Filed: Mar. 5, 2018

(86) PCT No.: PCT/JP2018/008382
§ 371 (c)(1),
(2) Date: Oct. 9, 2019

(87) PCT Pub. No.: WO2018/211784
PCT Pub. Date: Nov. 22, 2018

(65) Prior Publication Data
US 2020/0147849 A1    May 14, 2020

(30) Foreign Application Priority Data

May 17, 2017  (JP) ................................. 2017-098008
Aug. 3, 2017  (JP) ................................. 2017-150311

(51) Int. Cl.
B29C 45/76    (2006.01)
(52) U.S. Cl.
CPC ............... *B29C 45/7653* (2013.01); *B29C 2945/76013* (2013.01); *B29C 2945/7623* (2013.01);
(Continued)

(58) Field of Classification Search
None
See application file for complete search history.

(56) References Cited

U.S. PATENT DOCUMENTS

2005/0218544 A1  10/2005  Hakoda et al.
2008/0053188 A1  3/2008   Itoh
2018/0043649 A1  2/2018   Kurokawa

FOREIGN PATENT DOCUMENTS

JP    2-78516 A      3/1990
JP    200-190369 A   7/2000
(Continued)

OTHER PUBLICATIONS

International Search Report (PCT/ISA/210) issued in PCT/JP2018/008382, dated Apr. 10, 2018.
(Continued)

*Primary Examiner* — Peter L Vajda
*Assistant Examiner* — Adrianna N Konves
(74) *Attorney, Agent, or Firm* — Birch, Stewart, Kolasch & Birch, LLP

(57) ABSTRACT

The molding system including a molding apparatus comprising, a mold clamping force sensor for detecting a mold clamping force generated in a mold, a detection unit for detecting an apparatus failure of the molding apparatus and/or molding of a defective article by the molding apparatus based on an amount of change in mold clamping force detected by the mold clamping force sensor, an operation mode prediction unit for predicting the operation mode of the molding apparatus based on an amount of change in mold clamping force detected by the mold clamping force sensor and, an actual operation mode acquisition unit for acquiring the actual operation mode of the molding apparatus without relying on the mold clamping force sensor.

5 Claims, 15 Drawing Sheets

(52) U.S. Cl.
CPC ........... *B29C 2945/76391* (2013.01); *B29C 2945/76505* (2013.01); *B29C 2945/76709* (2013.01); *B29C 2945/76869* (2013.01); *B29C 2945/76936* (2013.01)

(56) References Cited

FOREIGN PATENT DOCUMENTS

| | | |
|---|---|---|
| JP | 2001-293760 A | 10/2001 |
| JP | 2003-236900 A | 8/2003 |
| JP | 2005-288893 A | 10/2005 |
| JP | 2007-30496 A | 2/2007 |
| JP | 2016-209885 A | 12/2016 |

OTHER PUBLICATIONS

Japan Decision to Grant a Patent for Application 2018-513897 dated May 31, 2019.
Naganuma et al., "Estimation of operation mode from the clamping force variation of injection molding machine (Application of big data from the injection molding machine under a production)", Transactions of the JSME (in Japanese), 2018, vol. 84, Issue 857, pp. 17-00417. https://www.jstage.jst.go.jp/article/transjsme/84/857/84_17-00417/_article/-char/en.
Written Opinion (PCT/ISA/237) issued in PCT/JP2018/008382, dated Apr. 10, 2018.

FIG. 9

|  |  | Predicted operation mode | |
|---|---|---|---|
|  |  | Semi-automatic operation mode | Fully automatic operation mode |
| Actual operation mode | Semi-automatic operation mode | TP(True Positive) | FN(False Negative) |
| | Fully automatic operation mode | FP(False Positive) | TN(True Negative) |

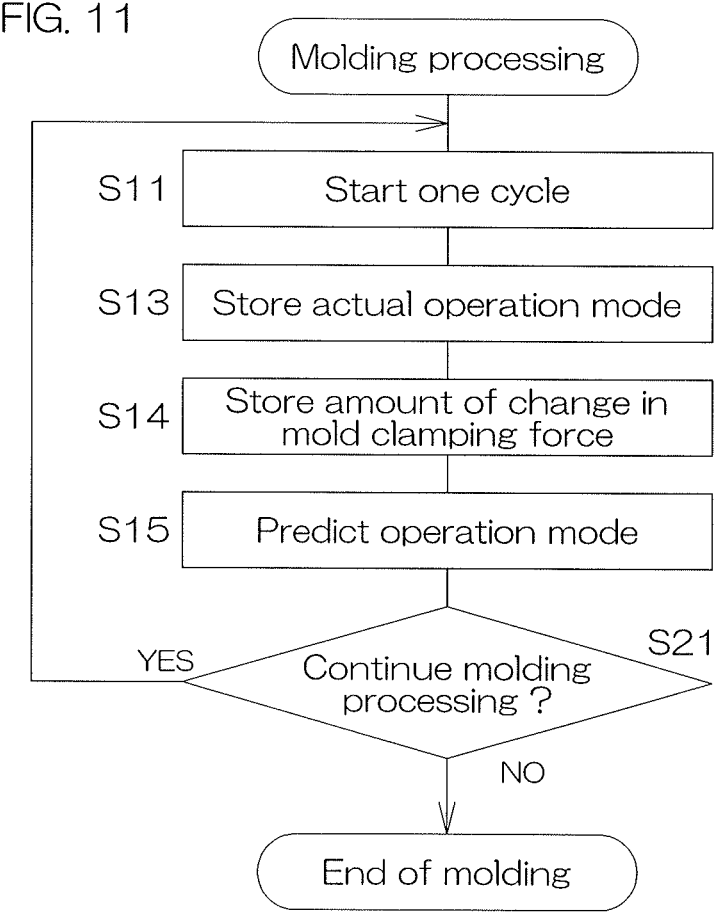

MOLDING SYSTEM, MOLDING APPARATUS, INSPECTION APPARATUS, INSPECTION METHOD, AND PROGRAM

TECHNICAL FIELD

The present invention relates to a molding system, a molding apparatus, an inspection apparatus, an inspection method, and a program.

BACKGROUND ART

Conventionally, various sensors for measuring data are attached to respective portions inside a molding apparatus. By using these sensors, processing is enabled such as detecting an abnormality to stop the molding apparatus.

As an injection molding apparatus for molding resin and metal, etc., electrically driven molding apparatuses using servo motors have appeared over the past twenty years, and most of molding apparatuses currently on the market are electrically driven molding apparatuses. A servo motor serves as a drive source and a sensor simultaneously. Therefore, feedback of information such as an external load on the servo motor has become easy in recent years. Further, due to development of sensor technology and computer technology, an environment has been realized in which temperature information and strain information on the inside of a mold of each molding apparatus during operation, and pressure information and speed information when injecting resin to the inside of the mold, etc., can be acquired in chronological order by a computer.

Conventionally, a technique of recognizing and determining an abnormality of an injection molding apparatus in a case where a detection value of a sensor attached to each portion of an injection molding apparatus deviates from a reference value range set in advance (that is, a set range considered not to cause a defective article) has been known. Specifically, a molded article non-defective/defective determination method described in Patent Literature 1 below and a molding failure prediction method described in Patent Literature 2 below have been proposed.

CITATION LIST

Patent Literature

Patent Literature 1: Japanese Patent Application Publication No. 2-78516
Patent Literature 2: Japanese Patent Application Publication No. 2001-293760

SUMMARY OF INVENTION

Technical Problem

In the molded article non-defective/defective judgment method described in Patent Literature 1, there is described a technique to determine a molded article as non-defective or defective by detecting a screw position and an injection pressure at a predetermined timing after elapse of an arbitrary time from the start of injection by an injection molding apparatus, and comparing values of the detected screw position and an injection pressure with determination reference values. However, there is a problem that it is not easy to determine a detection timing of a screw position and an injection pressure through experience of a molding engineer or trial and error and there is no alternative.

In the molding failure prediction method described in Patent Literature 2, correlation factors between physical amounts at the same time from cycle starts between respective shots and molded article quality data of each shot are successively calculated as correlative factors at the same time from the cycle starts at predetermined sampling time intervals. It is a method to determine, by setting an upper limit value and a lower limit value from the correlation factors at the same time, an article as defective in a case of exceeding the upper limit value or falling below the lower limit value. This system is a unit for only finding a defective article among molded articles, and not for grasping signs of occurrence of a failure in a molding apparatus such as an injection molding apparatus.

Also, there is a high possibility that a defective article (defective molded article) is mixed in molded articles molded by a molding apparatus in which a failure has occurred. Therefore, accurate detection of a failure of a molding apparatus leads to accurate detection of occurrence of a defective article. If a failure of a molding apparatus can be detected accurately, it is also possible to prevent a defective article from mixing into non-defective articles.

An object of the present invention is to provide a molding system, a molding apparatus, an inspection apparatus, an inspection method, and a program capable of accurately detecting a failure of a molding apparatus. Also, another object of the present invention is to provide a molding system and a molding apparatus capable of accurately detecting occurrence of a defective molded article.

Solution to Problem

A first aspect of the present invention provides a molding system including a molding apparatus that is provided with a mold provided so as to be openable and closable and a mold clamping mechanism to apply a mold clamping force to the mold, and including a mold clamping force sensor for detecting a mold clamping force generated in the mold, and a detection unit for detecting an apparatus failure of the molding apparatus and/or molding of a defective article by the molding apparatus based on an amount of change in mold clamping force detected by the mold clamping force sensor.

In this description, "an apparatus failure of a molding apparatus" is intended to include a failure of a mold clamping mechanism and a failure of a mold, etc.

In a preferred embodiment of the present invention, the molding system further includes an operation mode prediction unit for predicting, based on an amount of change in mold clamping force detected by the mold clamping force sensor, which of a plurality of operation modes including a fully automatic operation mode and a semi-automatic operation mode the operation mode of the molding apparatus is, and an actual operation mode acquisition unit for acquiring, without relying on the mold clamping force sensor, in operation of the molding apparatus, which of the plurality of operation modes the actual operation mode of the molding apparatus. The detection unit may include a determination unit for determining that the apparatus failure has occurred and/or the molding of a defective article has occurred in a case where an actual operation mode of the molding apparatus is the fully automatic operation mode, and an operation mode predicted by the operation mode prediction unit is the semi-automatic operation mode.

In this case, the molding system may further include a unit for predicting an operation mode of the molding apparatus by comparing an amount of change in mold clamping force detected by the mold clamping force sensor and a set predetermined threshold Further, in this case, a calculation unit for calculating a value based on whether an operation mode predicted by the operation mode prediction unit matches an actual operation mode acquired by the actual operation mode acquisition unit, and a unit for setting a value calculated by the calculation unit as the threshold.

In a preferred embodiment of the present invention, the molding system may further include an operation mode prediction unit for predicting an operation mode of the molding apparatus based on an amount of change in mold clamping force detected by the mold clamping force sensor, a calculation unit for calculating a value based on whether an operation mode predicted by the operation mode prediction unit matches an actual operation mode acquired by the actual operation mode acquisition unit, a threshold setting unit for setting a value calculated by the calculation unit as a threshold, and, in the detection unit, a unit for detecting the apparatus failure and/or the molding of a defective article by comparing a determination value calculated by the calculation unit in current molding with the threshold being a value calculated by the calculation unit in previous molding by the molding apparatus.

Also, the molding system may further include an accuracy rate calculation unit for calculating an accuracy rate of prediction results by the operation mode prediction unit in a past predetermined period, and a unit for calculating an amount of change in mold clamping force when the accuracy rate of the prediction results becomes highest, and sets the calculated amount of change as the threshold.

A second aspect of the present invention provides a molding apparatus that is provided with a mold provided so as to be openable and closable and a mold clamping mechanism to apply a mold clamping force to the mold, including a mold clamping force sensor for detecting a mold clamping force generated in the mold, and a detection unit for detecting an apparatus failure of the molding apparatus and/or molding of a defective article by the molding apparatus based on an amount of change in mold clamping force detected by the mold clamping force sensor.

A third aspect of the present invention provides an inspection apparatus being a failure detection apparatus that detects an apparatus failure of a molding apparatus that is provided with a mold provided so as to be openable and closable and a mold clamping mechanism to apply a mold clamping force to the mold, including a detection for that detecting the apparatus failure based on an amount of change in mold clamping force detected by a mold clamping force sensor for detecting a mold clamping force generated in the mold.

A fourth aspect of the present invention provides a method for inspecting a molding apparatus that is provided with a mold provided so as to be openable and closable and a mold clamping mechanism to apply a mold clamping force to the mold, being an inspection method including a mold clamping force detecting step of detecting, by a mold clamping force sensor, a mold clamping force generated in the mold, and a detecting step of detecting the apparatus failure based on an amount of change in mold clamping force detected by the mold clamping force sensor.

A fifth aspect of the present invention provides a program to be executed by a controller as a computer, including a group of steps incorporated so as to cause execution of a method for inspecting a molding apparatus that is provided with a mold provided so as to be openable and closable and a mold clamping mechanism to apply a mold clamping force to the mold, being an inspection method including a mold clamping force detecting step of detecting, by a mold clamping force sensor, a mold clamping force generated in the mold, and a detecting step of detecting the apparatus failure based on an amount of change in mold clamping force detected by the mold clamping force sensor.

Advantageous Effects of Invention

According to the present invention, based on an amount of change in mold clamping force detected by a mold clamping force sensor, an apparatus failure of a molding apparatus and/or molding of a defective article by a molding apparatus is detected. A molding system, a molding apparatus, an inspection apparatus, an inspection method, and a program capable of accurately detecting a failure of a molding apparatus can thereby be provided. Also, a molding system and a molding apparatus capable of accurately detecting molding of a defective article by a molding apparatus can be provided.

The above or yet other objects, features, and effects of the present invention will be made clear from the following description of the preferred embodiments with reference to the attached drawings.

BRIEF DESCRIPTION OF DRAWINGS

FIG. 9 is a diagram showing an example of a confusion matrix.

FIG. 11 is a flowchart showing a flow of molding processing to be executed in an injection molding apparatus according to a second preferred embodiment.

DESCRIPTION OF EMBODIMENTS

Hereinafter, preferred embodiments of the present invention are described in detail with reference to the attached drawings.

Figure 1:
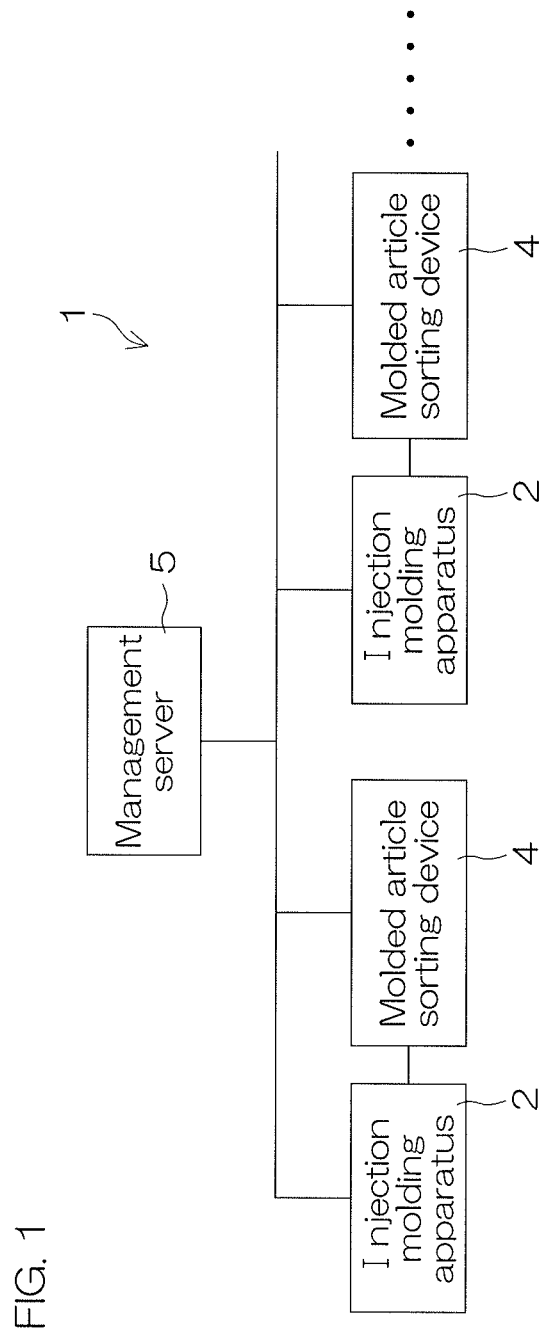
FIG. 1 is a diagram schematically showing a configuration of a molding system according to a first preferred embodiment of the present invention.

FIG. 1 is a diagram schematically showing a configuration of a molding system 1 according to a first preferred embodiment of the present invention.

The molding system 1 is an apparatus for molding molded articles.

The molding system 1 includes one or a plurality of injection molding apparatuses 2 as a molding apparatus or molding apparatuses, a molded article sorting device 4 that is provided on a one-to-one basis for each of the respective injection molding apparatuses 2, and sorts molded articles ejected from the injection molding apparatus 2 into non-defective articles and defective articles, and a management server 5 for managing the status of molding, etc., by the injection molding apparatus 2. The management server 5 is a so-called personal computer.

Figure 2A:
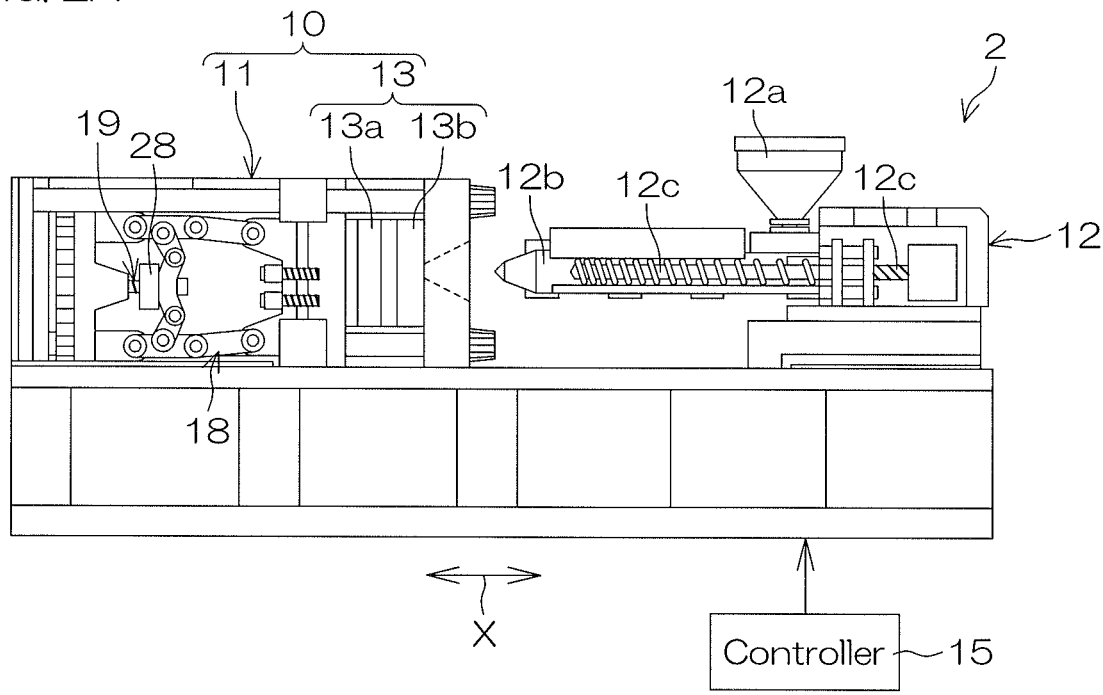
FIG. 2A is a side view showing a configuration of an injection molding apparatus included in the molding system.
Figure 2B:
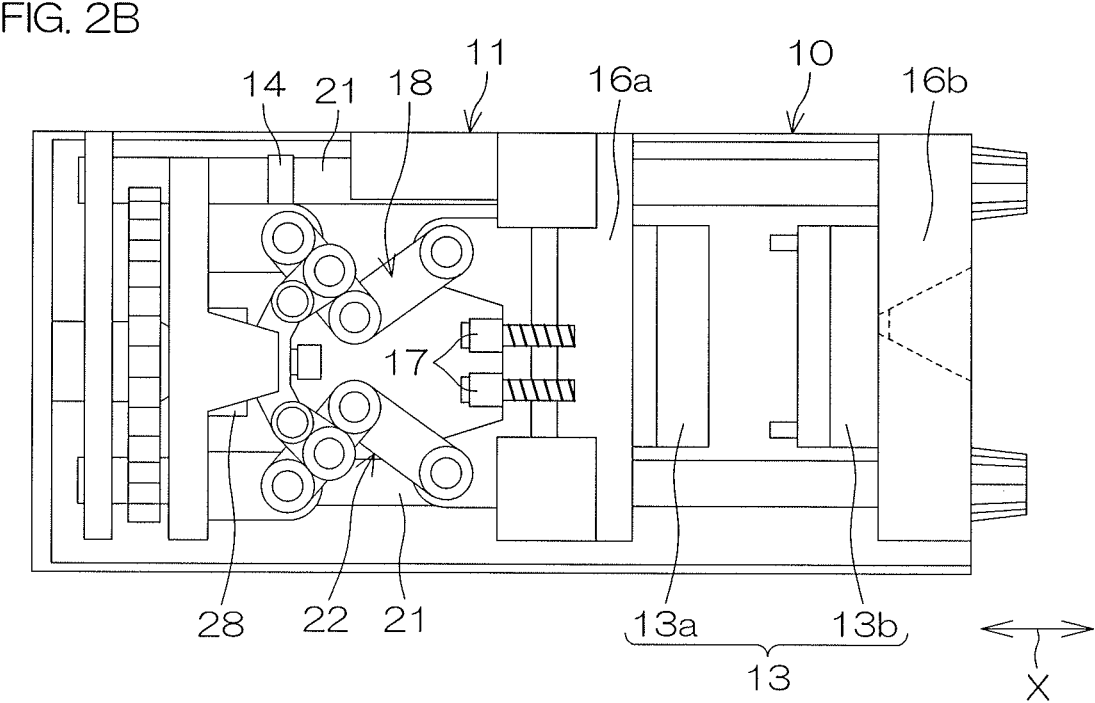
FIG. 2B is a side view showing a structure of a mold clamping device included in the injection molding apparatus.

FIG. 2A is a side view showing a configuration of the injection molding apparatus 2. FIG. 2B is a side view showing a structure of a mold clamping device 10.

As an example of the injection molding apparatus 2, in FIG. 2A, a mold-openable/closable horizontal apparatus is described by way of example. The injection molding apparatus 2, and includes a mold clamping device 10 provided so as to be capable of opening and closing the mold and having a mold 13, an injection device 12 that supplies (injects) molten resin into the mold 13, a mold clamping force sensor 14 that detects a mold clamping force of the mold clamping device 10, and a controller 15 for controlling these members.

The mold clamping device 10 includes the mold 13, and a mold clamping mechanism 11 that opens and closes the mold 13, and applies a mold clamping force to the mold 13 being in a closed state. The mold 13 includes a movable-side mold 13a and a fixed-side mold 13b.

As shown in FIG. 2B, the mold clamping mechanism 11 is, for example, a toggle-type mold clamping mechanism. The mold clamping mechanism 11 further includes a movable platen 16a joined to the movable-side mold 13a so as to be movable to accompany the movable-side mold 13a, a fixed platen 16b joined to the fixed-side mold 13b, an ejector mechanism 17 coupled to the fixed-side mold 13b, a toggle 18 (pressing unit) that presses the movable platen 16a against the fixed platen 16b, a ball screw 19 (refer to FIG. 1) joined to the toggle 18, a first servo motor 20 (not shown in FIG. 2A and FIG. 2B; refer to FIG. 3A) that applies a rotary drive force to the ball screw 19, and a plurality (for example, four) of tie bars 21.

The toggle 18 is coupled to both of a screw shaft of the ball screw 19 and the movable platen 16a. The toggle 18 has a toggle arm 22 provided so as to be changeable in posture between a stretched state and a bent state and a cross head 28 joined to the toggle arm 22. The cross head 28 is provided so as to be movable in an axial direction to accompany the screw shaft of the ball screw 19.

In the mold clamping mechanism 11, by reciprocating the movable platen 16a along an X direction (one direction along the horizontal direction) by the toggle 18, the mold 13 is opened and closed.

When the first servo motor 20 (not shown in FIG. 2A and FIG. 2B; refer to FIG. 3A) is driven to rotate, this rotary driving of the servo motor is converted by the ball screw 19 to driving in an axial direction (direction along the X direction) of the screw shaft thereof. Along driving in the axial direction (direction along the X direction) of the screw shaft, the toggle arm 22 is changed in posture between a stretched state that the toggle arm 22 is stretched and a bent state that the toggle arm 22 is bent. The toggle 18 is thereby changed in posture between an opened state (refer to FIG. 2A) and a closed state (refer to FIG. 2B). FIG. 2A shows a state where the fixed-side mold 13b is in contact with the movable-side mold 13a, and FIG. 2B shows a state where the fixed-side mold 13b is separated from the movable-side mold 13a. In the state where the fixed-side mold 13b is in contact with the movable-side mold 13a (the state shown in FIG. 2A), a mold clamping force determined in advance is caused to be generated in the mold 13 by stretching the plurality of tie bars 21 (pressure rising operation). The mold clamping force at this time is detected by the mold clamping force sensor 14 (mold clamping force detecting step). The mold clamping force sensor 14 is attached to at least one (for example, one) tie bar 21 of the plurality of tie bars 21 in the present preferred embodiment. The mold clamping force sensor 14 is, for example, a strain gauge sensor. A sensor other than the strain gauge sensor may be employed as the mold clamping force sensor 14.

As shown in FIG. 2A, the injection device 12 is a device for injecting heated and molten resin into the mold 13. The injection device 12 includes a hopper 12a, a cylinder 12b, a heater (not shown) for heating the cylinder 12b, a screw 12c housed inside the cylinder 12b, and a second servo motor 30 (not shown in FIG. 2A and FIG. 2B; refer to FIG. 3A) for rotationally driving the screw 12c. The hopper 12a retains resin. The resin input into the cylinder 12b from the hopper 12a is heated inside the cylinder 12b. Along with rotation of the screw 12c, the resin is moved inside the cylinder 12b toward the mold 13 side, and fed in a molten state to a mold 13 side end portion of the cylinder 12b. When a predetermined amount of molten resin is pooled at the mold 13 side end portion of the cylinder 12b, the mold 13 closes. Then, the pooled resin is injected in a high-temperature and high-pressure state into the mold 13 by one shot. The injection molding apparatus 2 is a versatile machine capable of producing a wide variety of molded articles by changing the kind of resin and/or the mold 13.

Next, a molding process using the injection molding apparatus 2 is described. The molding process of injection molding includes a total of five steps, that is, a mold clamping step (P1 in FIG. 4), an injection/pressure-keeping step (P2 in FIG. 4), a cooling step (P3 in FIG. 4), a mold opening step (P4 in FIG. 4), and a product ejecting step (P5 in FIG. 4).

In the mold clamping step (P1), from an opened state of the mold 13, the first servo motor 20 is driven so as to put the toggle 18 into an opened state, and the movable-side mold 13a is brought into contact with the fixed-side mold 13b (the mold 13 is put into a closed state). At this time, the mold 13 is closed with a high pressure by stretching the plurality of tie bars 21, and a predetermined mold clamping force is caused to be generated in the mold 13 (pressure rising operation). After the mold clamping step (P1), the injection/pressure-keeping step (P2) is executed.

In the injection/pressure-keeping step (P2), resin is filled at a high temperature and a high pressure in the mold 13 from the inside of the cylinder 12b, and the pressure is kept. After the injection/pressure-keeping step (P2), the cooling step (P3) is executed.

In the cooling step (P3), while the mold 13 is left closed, the resin filled in the mold 13 is cooled until it becomes solidified. In parallel with the cooling step (P3), the second servo motor 30 is driven so as to rotate the screw 12c, and resin is supplied into the cylinder 2b. After the cooling step (P3), the mold opening step (P4) is executed.

In the mold opening step (P4), the first servo motor 20 is driven so as to put the toggle 18 into a closed state, and the movable-side mold 13a is separated from the fixed-side mold 13b.

Thereafter, a molded article is ejected from the mold 13 by using an ejector mechanism 17 in the product ejecting step (P5). These five steps above are referred to as one cycle.

In the injection molding apparatus 2, a fully automatic operation mode and a semi-automatic operation mode are prepared as operation modes. The fully automatic operation mode refers to a state where automatic continuous molding (continuous production) through the above-described five steps is repeated without intervention of an operator. The semi-automatic operation mode refers to a state where an operator operates the injection molding apparatus 2 while operating an operation button (not shown) of the injection molding apparatus 2. In the semi-automatic operation mode, the apparatus automatically operates until the end of execution of one cycle of molding, however, after the execution of one cycle of molding, the apparatus stops. Then, unless an operator operates an operation button (not shown) of the injection molding apparatus 2 afterwards, molding processing by the injection molding apparatus 2 is not executed. The injection molding apparatus 2 operates in the semi-automatic operation mode in a case where an adjustment operation is performed at the start and/or end of the production, and in a case of restoration from various troubles (a trouble in post-process and a trouble inside the injection molding apparatus 2), etc. In other words, the semi-automatic operation mode is an unstable operation state of the injection molding apparatus 2. Therefore, in the semi-automatic operation mode, defective articles frequently occur. Generally, a molded article molded in the semi-automatic operation mode is afterwards disposed of (sorted out as a defective article by the molded article sorting device 4).

In order to acquire physical amounts such as an injection pressure, a screw position, a screw speed, an in-mold pressure, an ejector position, an ejector thrust, a mold platen position, a mold platen thrust, a mold parting face spacing, a mold clamping force, and a mold temperature, various sensors are attached to currently available injection molding apparatuses. However, in actuality, manufacturing companies which manufacture molded articles by using these injection molding apparatuses cannot utilize big data acquired due to a shortage of engineers skilled, etc., for example, in a method of analyzing big data acquired from injection molding apparatuses connected to each other by a network. On the other hand, there are adverse effects on the side of research institutions as well, and their research on utilization of big data at manufacturing sites has not advanced due to the difficulty in acquisition of big data necessary for research and difficulty in acquisition of structural information on injection molding apparatuses, etc., for example, because of issues concerning trade secrets and network security, etc. Therefore, at many manufacturing sites, problems occur in which a failure of an injection molding apparatus which suddenly occurred during past production requires a long time for repair and recovery.

The molding system 1 according to this preferred embodiment collects log data of physical amounts (mold clamping force) output from sensors attached to respective portions of the injection molding apparatuses 2 in operation for production. The molding system 1 can detect and sort out in real time a shot of a product suspected to be a defective article, and grasp signs of an abnormality of the injection molding apparatus 2 in advance. Shots mean the number of injections of resin from the injection molding apparatus 2 into the mold 13, and when the number of cavities of the mold 13 is "4," four products can be molded by one shot.

Figure 3A:
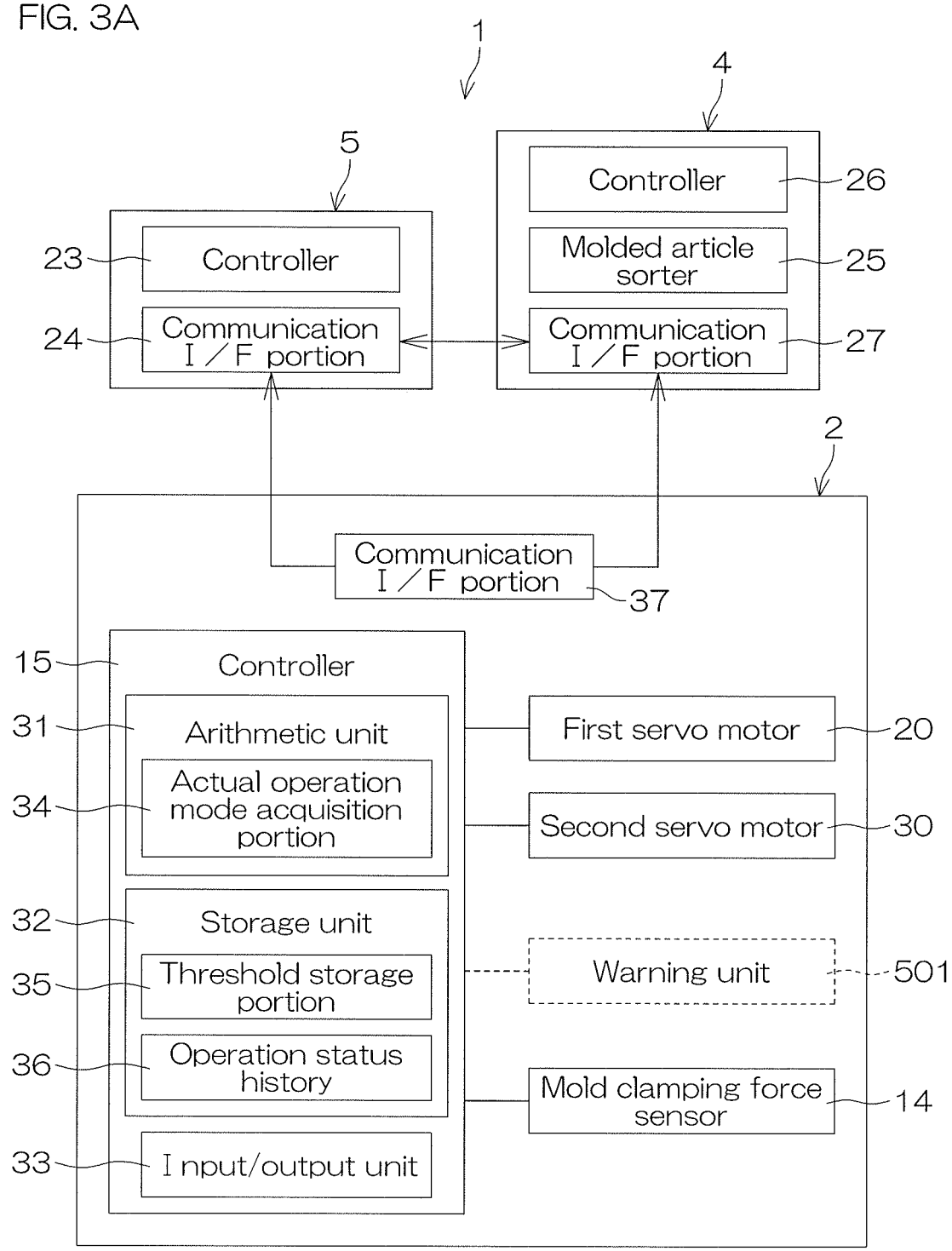
FIG. 3A is a block diagram showing an electrical configuration of the molding system.

FIG. 3A is a block diagram showing an electrical configuration of the molding system 1.

The management server 5 includes a controller 23. The controller 23 is configured by using a microcomputer (computer). The controller 23 is provided so as to be capable of communicating with each injection molding apparatus 2 and each molded article sorting device 4 through a communication I/F (interface) portion 24. The management server 5 is not limited to configurations using hardware, but may be configured by software using a network such as the Internet.

The molded article sorting device 4 includes a molded article sorter 25 that sorts molded articles ejected from the injection molding apparatus 2 into non-defective articles and defective articles, and a controller 26 that controls the molded article sorter 25. The controller 26 is provided so as to be capable of communicating with the management server 5 and a corresponding injection molding apparatus 2 through a communication I/F (interface) portion 27.

The controller 15 of the injection molding apparatus 2 is configured by using, for example, a microcomputer. The controller 15 includes an arithmetic unit 31 such as a CPU, a storage unit 32, and an input/output unit 33 (for example, RS232C; not shown).

The controller 15 includes an actual operation mode acquisition portion 34 that acquires a current actual operation status of the injection molding apparatus 2 (that is, whether in the fully automatic operation mode or the semi-automatic operation mode). The actual operation mode acquisition portion 34 judges whether the actual operation mode of the injection molding apparatus 2 is the fully automatic operation mode or the semi-automatic operation mode based on input statuses of various operation buttons and an actual operation status of the injection molding apparatus 2. That is, the actual operation mode acquisition portion 34 acquires a current operation status of the injection molding apparatus 2 without being based on a value of the mold clamping force sensor 14.

In the storage unit 32, a program (not shown) to be executed by the arithmetic unit 31 is stored. The arithmetic unit 31 controls operations of the first and second servo motors 20 and 30, etc., according to a program determined in advance. Also, it is possible to input a detection output from the mold clamping force sensor 14 to the controller 15.

Also, the storage unit 32 includes a threshold storage portion 35 that stores a threshold to be used for prediction of an operation mode of the injection molding apparatus 2 and an operation status history 36 for storing records of the operation status of the injection molding apparatus 2, described below. The storage unit 32 is configured by using a fixed memory device (not shown), a hard disk drive, etc.

The arithmetic unit 31 of the controller 15 predicts whether the operation mode of the injection molding apparatus 2 is the fully automatic operation mode or the semi-automatic operation mode based on an amount of change in mold clamping force detected by the mold clamping force sensor 14. With this first preferred embodiment, the arithmetic unit 31 realizes an operation mode prediction unit that predicts whether the operation mode of the injection molding apparatus 2 is the fully automatic operation mode or the semi-automatic operation mode.

Also, the arithmetic unit 31 of the controller 15 determines that an apparatus failure (a failure of the injection molding apparatus 2 including the mold clamping device 10) has occurred in a case where the actual operation mode of the injection molding apparatus 2 is the fully automatic operation mode and a predicted operation mode is the semi-automatic operation mode. In the first preferred embodiment, the arithmetic unit 31 realizes a determination unit that determines that an apparatus failure has occurred.

Operation mode prediction is performed by the arithmetic unit 31 of the controller 15 by comparing an amount of change in mold clamping force detected by the mold clamping force sensor 14 and a threshold stored in the threshold storage portion 35 of the storage unit 32.

Figure 3B:
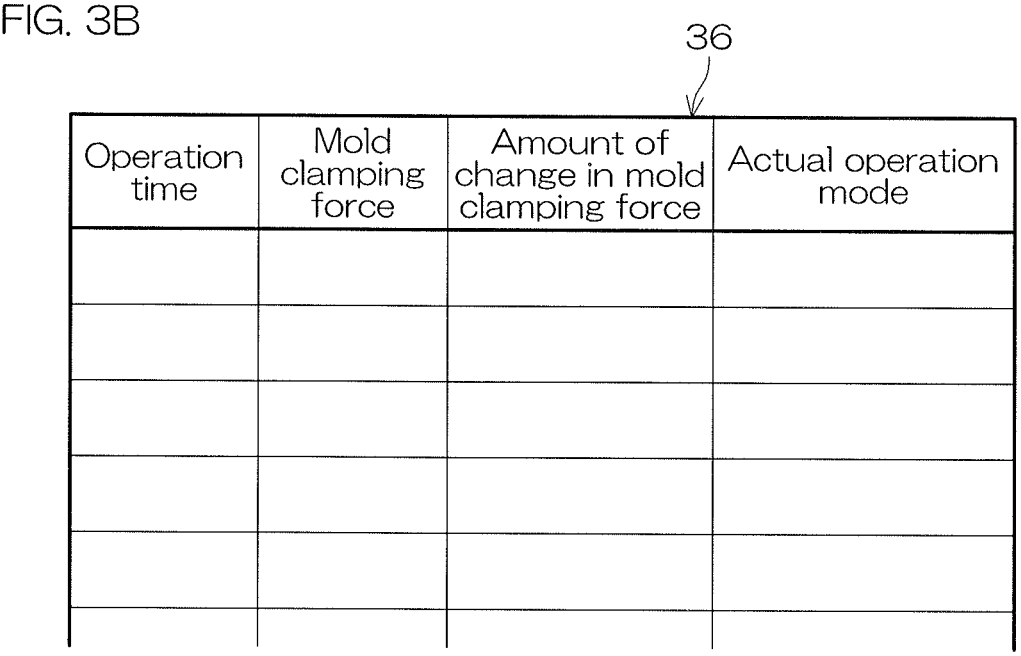
FIG. 3B is a diagram showing stored content in an operation status history shown in FIG. 3A.

FIG. 3B is a diagram showing stored content in the operation status history 36. In the operation status history 36 in FIG. 3B, an operation time, a mold clamping force detected at the operation time, an amount of change in mold clamping force at the operation time, and an actual operation mode of the injection molding apparatus 2 at the operation time (that is, an operation mode judged by the actual operation mode acquisition portion 34) are stored in association with each other.

The injection molding apparatus 2 includes a communication I/F (interface) portion 37. The controller 15 is provided so as to be capable of communicating with the management server 5 and a corresponding molded article sorting device 4 through the communication I/F portion 37.

Figure 4:
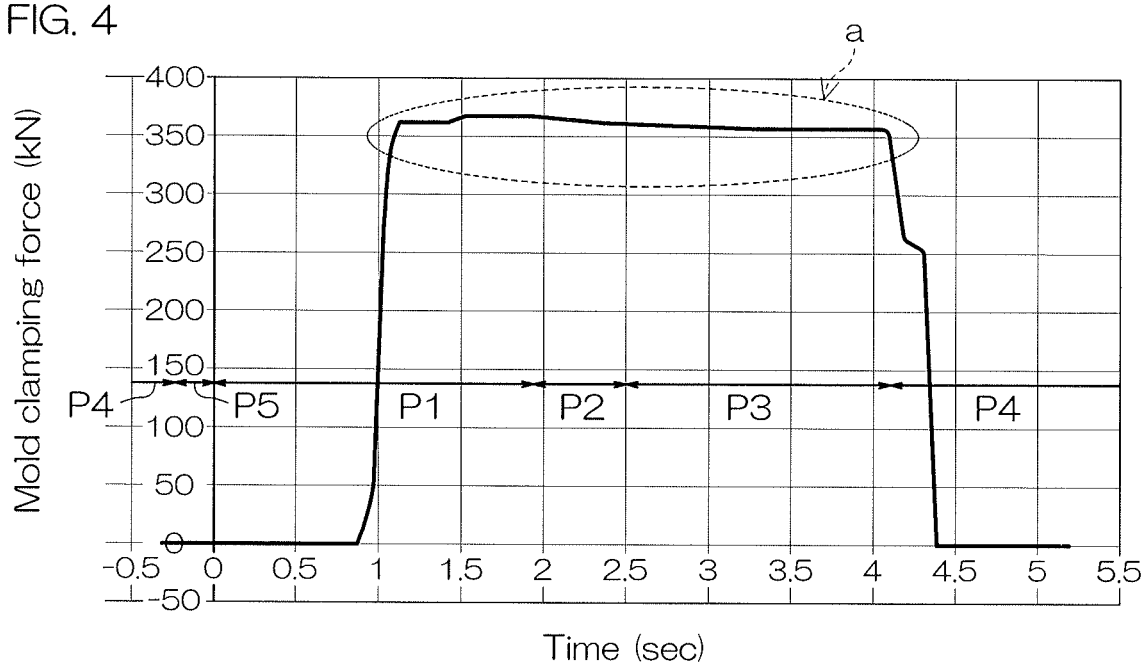
FIG. 4 is a graph showing changes in mold clamping force during one cycle of molding.
Figure 5:
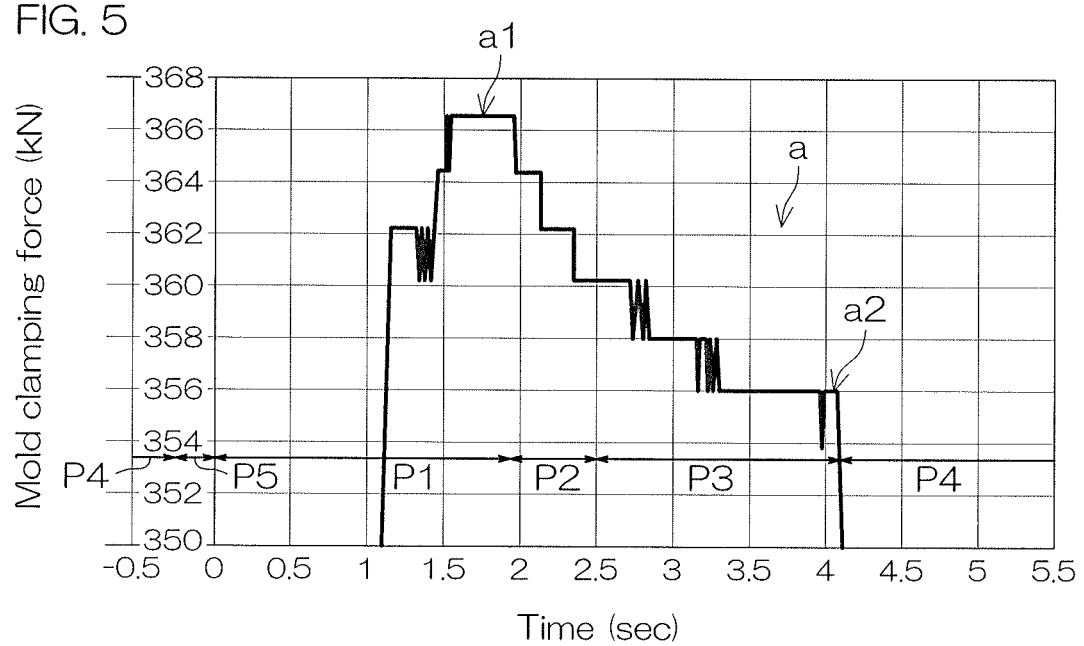
FIG. 5 is a graph showing an a part in FIG. 4 in an enlarged manner.
Figure 6:
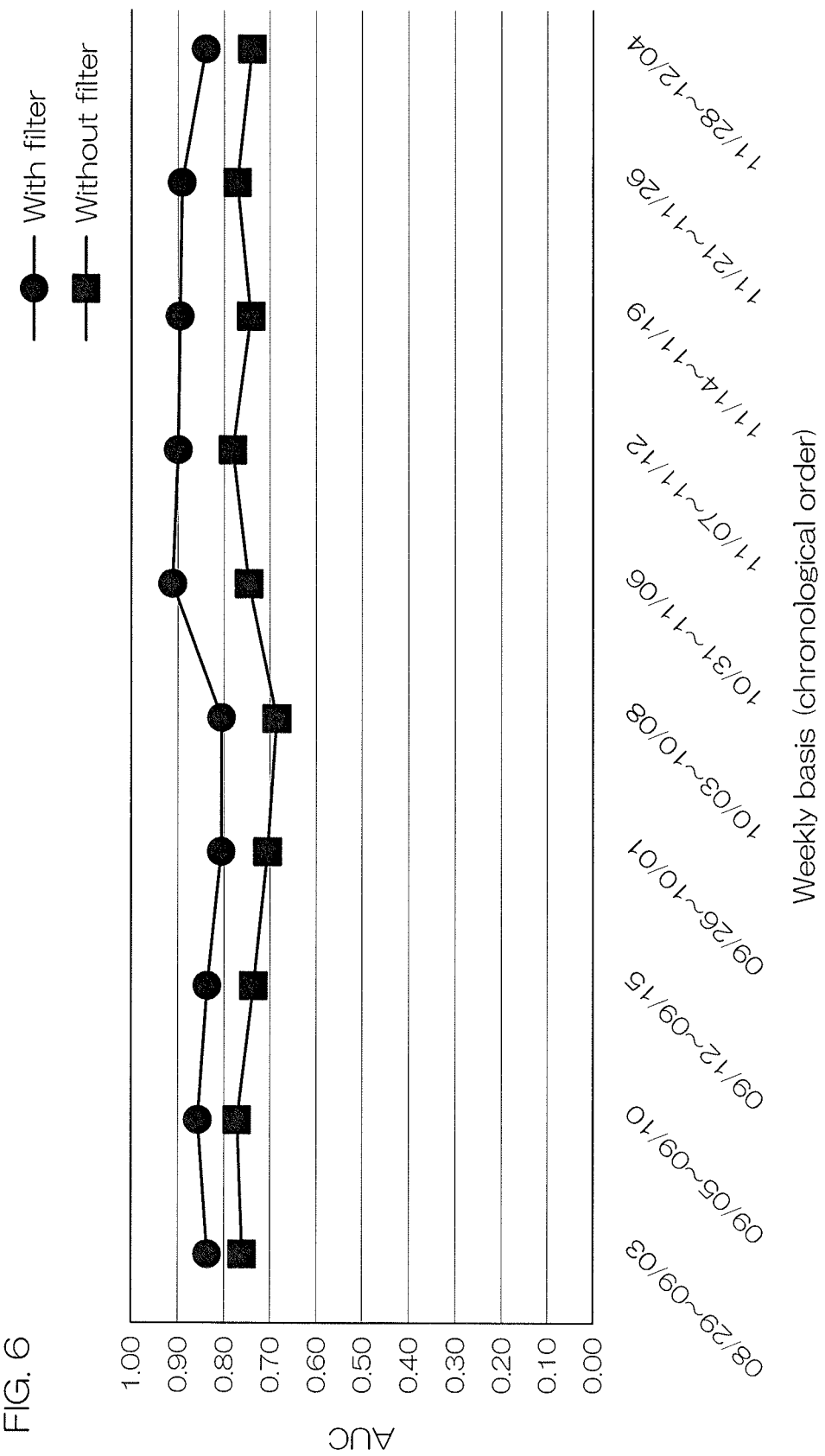
FIG. 6 is a graph showing an AUC in comparison.
Figure 7:
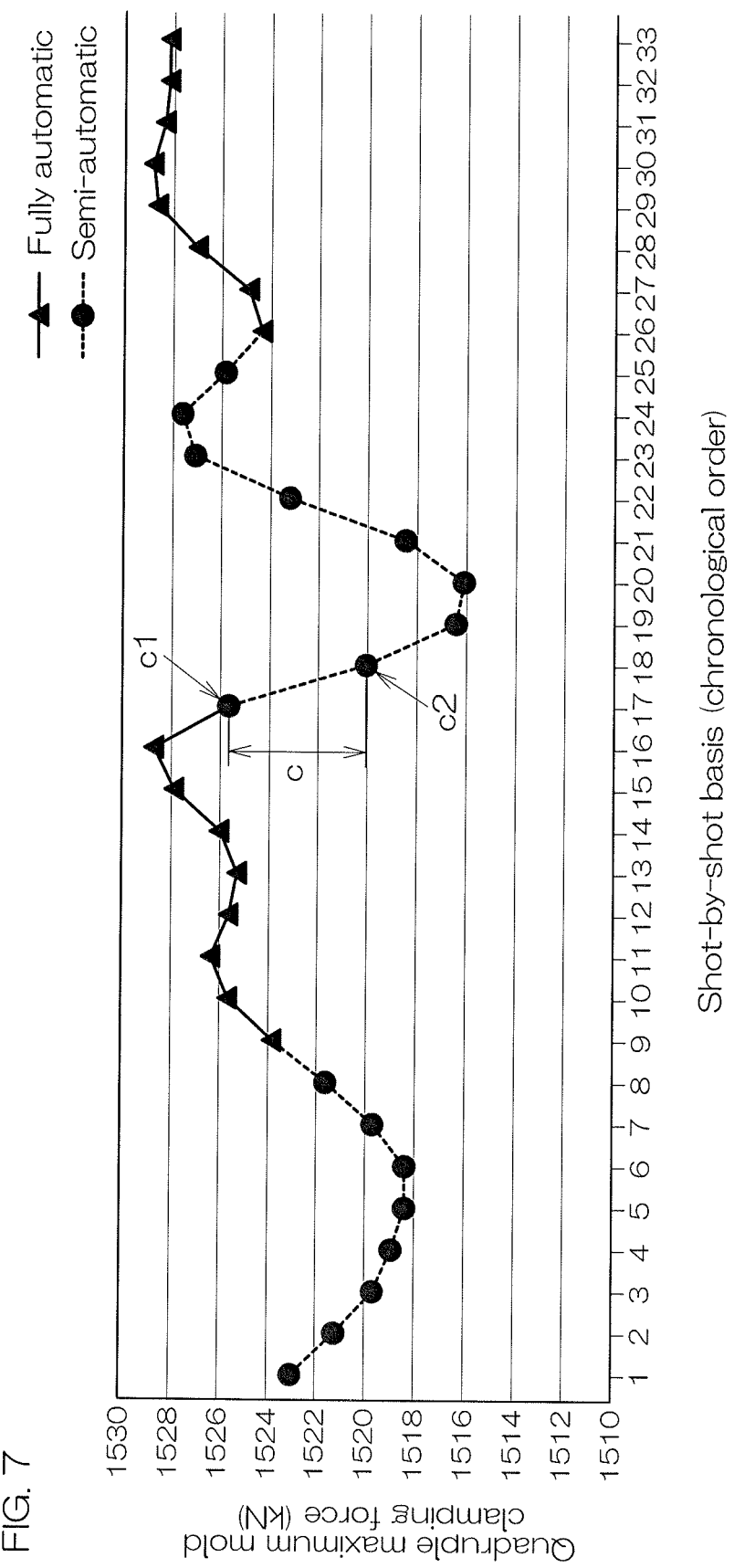
FIG. 7 is a graph showing an amplitude of a quadruple maximum mold clamping force.
Figure 8:
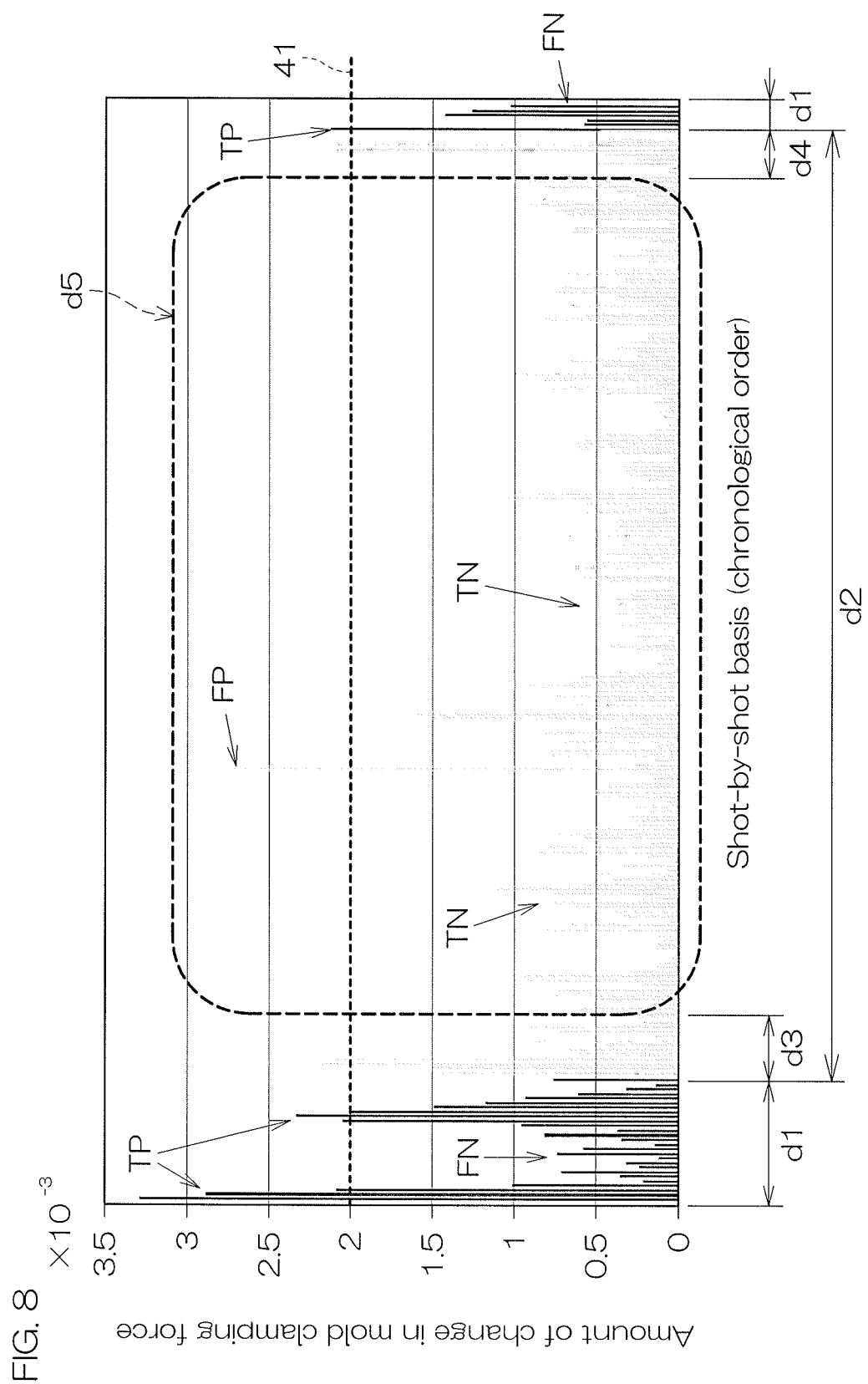
FIG. 8 is a bar graph showing a part of calculated amounts of change in mold clamping force.

FIG. 4 is a graph showing changes in mold clamping force during one cycle of molding. FIG. 5 is a graph showing an a part (the part enclosed by a dashed line) in FIG. 4 in an enlarged manner. FIG. 6 is a graph showing an AUC (Area Under the ROC Curve) in comparison. FIG. 7 is a graph showing an amplitude of a quadruple maximum mold clamping force. Referring to FIG. 4 to FIG. 7, an amount of change in mold clamping force to be used for prediction of an operation mode is described. FIG. 8 is a bar graph showing a part of calculated amounts of change in quadruple maximum mold clamping force.

In FIG. 4, a mold clamping force (axial force of the tie bar 21 (refer to FIG. 1)) is measured at a temporal resolution of 25 msec. FIG. 4 shows that the mold clamping force changes during one cycle. As shown in FIG. 4, the mold clamping force is continuously generated during the period from the mold clamping step (P1) to the mold opening step (P4). In FIG. 5, a portion at which the mold clamping force becomes maximum during one cycle is defined as an a1 portion, and a portion representing a time 0.1 seconds before the completion of the cooling step (P3) is defined as an a2 portion.

With this preferred embodiment, a value of a maximum mold clamping force a1 at which the mold clamping force takes the largest value among the mold clamping forces in one cycle is used as a mold clamping force that becomes a basis of prediction of an operation mode. In this preferred embodiment, the mold clamping force sensor 14 (one in number) is attached to only one of the plurality (for example, four) of tie bars 21 in the injection molding apparatus 2. Therefore, a mold clamping force generated in the injection molding apparatus 2 is approximately the quadruple of a mold clamping force generated in one tie bar 21. With this preferred embodiment, calculation is performed by using a quadruple maximum mold clamping force obtained by quadrupling (multiplying by a number equal to the number of tie bars 21) the value of a maximum mold clamping force a1 acquired by the mold clamping force sensor 14 attached to one tie bar 21.

Next, correction of the quadruple maximum mold clamping, force is described. The quadruple maximum mold clamping force is corrected (smoothed) by a weighting filter (filter for weighting). Specifically, a corrected quadruple maximum mold clamping force is calculated by applying the weighting filter to a total of three data including a quadruple maximum mold clamping force at a current time point, a quadruple maximum mold clamping force at a time point immediately previous to the current time point (hereinafter, may be referred to as "immediately previous quadruple maximum mold clamping force"), and a quadruple maximum mold clamping force at a time point two before the current time point (hereinafter, may be referred to as "two-before quadruple maximum mold clamping force." For example, a case where a value of a quadruple maximum mold clamping force at a current time point is "1528," a value of an immediately previous quadruple maximum mold clamping force is "1520," and a value of a two-before quadruple maximum mold clamping force is "1516" is considered. In this case, a value of a quadruple maximum mold clamping force after correction is ((1528×6)+(1520×4)+1516)/11, that is, 1524.

In FIG. 6, an AUC in a case where correction by the weighting filter is performed (shown by • in FIG. 6) and an AUC in a case where correction by the weighting filter is not performed (shown by ■ in FIG. 6) are compared. An AUC is an area under the ROC curve, and is one of the accuracy evaluation methods in a two-group classification problem. The higher the value of an AUC, the higher the accuracy evaluation in a two-group classification problem. It is understood from FIG. 6 that the value of an AUC is higher, that is, the accuracy evaluation is higher in the case where a corrected quadruple maximum mold clamping force is used than in the case where an uncorrected quadruple maximum mold clamping force is used. It is noted that the weighting filter illustrated in this description is a weighting filter improved taking a cue from a method used in smoothing of a digital image, etc., however, there are other various technique as the method for weighting, and the method is therefore not limited to the method illustrated in this description.

FIG. 7 shows corrected quadruple maximum mold clamping forces calculated by the weighting filter shot-by-shot in chronological order. In FIG. 7, a shot from the fully automatic operation mode of the injection molding apparatus 2 is illustrated as ▲, and a shot from the semi-automatic operation mode of the injection molding apparatus 2 is illustrated as •.

In a case where a corrected quadruple maximum mold clamping force at a current time point is a predetermined quadruple maximum mold clamping force c2 (refer to FIG. 7), an amplitude difference between this quadruple maximum mold clamping force c2 and a quadruple maximum mold clamping force c1 at the previous time point is defined as a value of an amplitude c (refer to FIG. 7).

An amount of change in mold clamping force is calculated based on the amplitude c. An amount of change in mold clamping force is calculated based on the following Equation (1).

$$\text{Amount of change in mold clamping force} = |(\text{quadruple maximum mold clamping force } c2 - \text{quadruple maximum mold clamping force } c1)/\text{quadruple maximum mold clamping force } c1| \quad (1)$$

It can be read from FIG. 8 that the amount of change in mold clamping force is larger in the semi-automatic operation mode d1 than in the fully automatic operation mode d2.

By comparing the amount of change in mold clamping force calculated as described above and a threshold stored in the threshold storage portion 35 of the storage unit 32, an actual operation mode of the injection molding apparatus 2 is predicted. Specifically, the arithmetic unit 31 of the controller 15 compares the calculated amount of change in mold clamping force and the threshold stored in the threshold storage portion 35 of the storage unit 32. Then, in a case where the calculated amount of change in mold clamping force exceeds the threshold, the arithmetic unit 31 predicts an actual operation mode to be the semi-automatic operation mode, and in a case where the calculated amount of change in mold clamping force is equal to or smaller than the threshold, the arithmetic unit predicts an actual operation mode to be the fully automatic operation mode (prediction of operation mode).

In this preferred embodiment, the threshold stored in the threshold storage portion 35 of the storage unit 32 is provided so as to be updatable. Specifically, this threshold is calculated based on whether an operation mode predicted based on an amount of change in mold clamping force in a past predetermined period (for example, in past one day (24 hours)) and an actual operation mode match each other (whether or not the prediction result of the operation mode prediction is correct). The past predetermined period is not limited to one day (24 hours), and may be several days or several weeks. Alternatively, it may be several hours. However, it is desirable that both of the fully automatic operation mode and the semi-automatic operation mode appear at some degree of appearance ratio, therefore, the past predetermined period is preferably one day or more.

More specifically, an amount of change in mold clamping force when an accuracy rate of operation mode prediction results in the past predetermined period is high is calculated as a threshold. The threshold is updated at predetermined timings. In this preferred embodiment, the threshold is updated, for example, once a day (for example, at a predetermined time, etc.).

Specifically, in order to perform operation mode prediction, the arithmetic unit 31 of the controller 15 compares an amount of change in mold clamping force in the past predetermined period stored in the operation status history 36 with the threshold. Then, by changing this threshold in a predetermined range, the arithmetic unit 31 checks accuracy rates of prediction results of operation mode at the respective thresholds. Then, a value that derives the highest accuracy rate is calculated as a threshold, and this value is stored as an update in the threshold storage portion 35 of the storage unit 32. A method of calculating a threshold that derives the highest accuracy rate is specifically described with reference to FIG. 8 and FIG. 9.

FIG. 9 is a diagram showing an example of a confusion matrix. In this preferred embodiment, the confusion matrix is a table summarizing classified actual values (corresponding to whether the fully automatic operation mode d2 or the semi-automatic operation mode d1), and true/false (correct or incorrect) of prediction results. In FIG. 9, actual operation modes are shown in vertical columns, and predicted operation modes are shown in horizontal rows.

A case where the actual operation mode is the semi-automatic operation mode d1 and the prediction result is the semi-automatic operation mode (correct) is classified as "TP (True Positive)" in FIG. 9.

A case where the actual operation mode is the semi-automatic operation mode d1 and the prediction result is the fully automatic operation mode (incorrect) is classified as "FN (False Negative)" in FIG. 9.

A case where the actual operation mode is the fully automatic operation mode d2 and the prediction result is the fully automatic operation mode (correct) is classified as "TN (True Negative)" in FIG. 9.

A case where the actual operation mode is the fully automatic operation mode d2 and the prediction result is the fully automatic operation mode (incorrect) is classified as "FP (False Positive)" in FIG. 9.

In FIG. 8, the Y axis represents amounts of change in mold clamping force, and the X axis represents respective shots in chronological order. In FIG. 8, a separation line 41 (shown by a dashed line in FIG. 8) parallel to the X axis is drawn in order to separate into a position of a maximum value of the amount in change in mold clamping force and a position of a minimum value of the amount in change in mold clamping force. While moving the separation line 41 in a direction in which the amount of change in mold clamping force becomes smaller (from the upper side toward the lower side in FIG. 8), the number of values included in "TP," the number of values included in "FP," the number of values included in "FN," and the number of values included in "TN" are counted respectively. Alternatively, it may be configured such that the separation line 41 is moved in a direction in which the amount of change in mold clamping force becomes larger (from the lower side toward the upper side in FIG. 8). The accuracy rate is calculated by the following Equation (2).

$$\text{Accuracy rate} = (TP+TN)/(TP+FP+TN+FN) \qquad (2)$$

Accordingly, many separation lines 41 are drawn. The arithmetic unit 31 of the controller 15 calculates an accuracy rate at positions that the respective separation lines 41 pass through, and calculates (the vicinity of) a position of an amount of change in mold clamping force at which a highest accuracy rate is shown, as a threshold. The calculated threshold is set in the threshold storage portion 35.

Accordingly, multiple patterns of separation lines 41 are drawn, accuracy rates are calculated at the respective positions that the separation lines 41 pass through, and (the vicinity of) a position of an amount of change in mold clamping force at which a highest accuracy rate is shown is calculated as a threshold. The calculated threshold is set in the threshold storage portion 35.

Figure 10A:
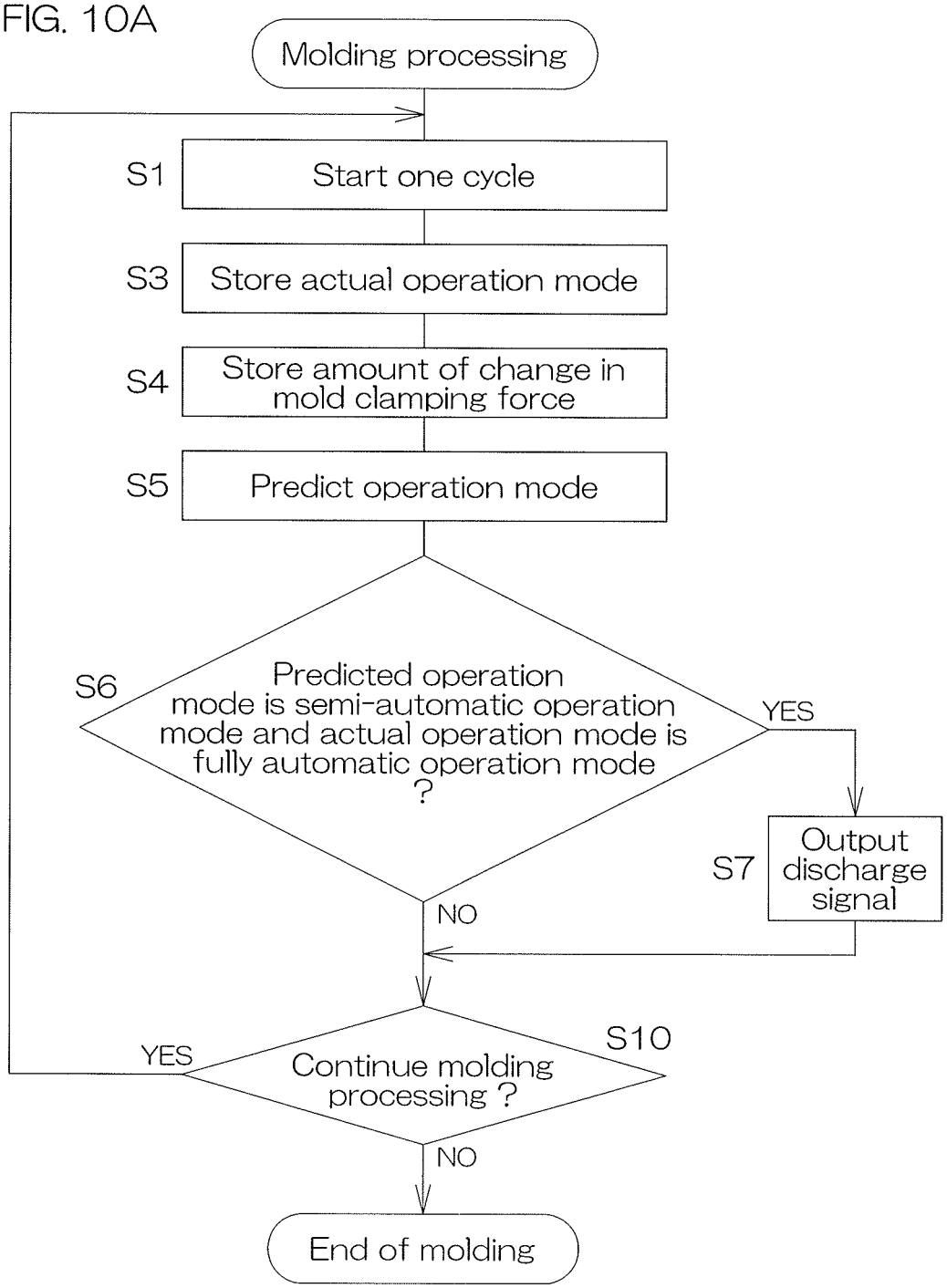
FIG. 10A is a flowchart showing a flow of molding processing to be executed in the injection molding apparatus.

FIG. 10A is a flowchart showing a flow of molding processing to be executed in the injection molding apparatus 2.

In the injection molding apparatus 2, a case where one cycle of molding processing is fully automatically operated, that is, a case where the operation mode of the injection molding apparatus 2 is the fully automatic operation mode, is described with reference to FIG. 10A. After the start (S1 in FIG. 10A) of one cycle of molding processing, first, the mold clamping step (P1 in FIG. 4) is executed. Specifically, the controller 15 controls the first servo motor 20 and brings the movable-side mold 13a into contact with the fixed-side mold 13b, and stretches the plurality of tie bars 21 to generate a mold clamping force in the mold 13 (pressure rising operation). The mold clamping force at this time is detected by the mold clamping force sensor 14 (mold clamping force detecting process). After the end of the mold clamping step (P1), the controller 15 executes other steps (P2 to P5 in FIG. 4) of the molding processing in order. That is, the injection/pressure-keeping step (P2 in FIG. 4), the cooling step (P3 in FIG. 4), the mold opening step (P4 in FIG. 4), and the product ejecting step (P5 in FIG. 4) are executed in this order.

Also, the actual operation mode acquisition portion 34 of the controller 15 judges an actual operation mode of the injection molding apparatus 2 at the time of execution of the mold clamping step (P1), and stores the actual operation mode in the operation status history 36 of the storage unit 32 (S3 in FIG. 10A). The arithmetic unit 31 of the controller 15 calculates a quadruple maximum mold clamping force at the time of execution of the mold clamping step (P1) and corrects the quadruple maximum mold clamping force by the above-described weighting filter, and then calculates an amount of change in mold clamping force based on the Equation (1). The arithmetic unit 31 of the controller 15 stores the calculated amount of change in mold clamping force in the operation status history 36 of the storage unit 32 of the controller 15 (S4 in FIG. 10A).

Also, the arithmetic unit 31 of the controller 15 predicts whether the operation mode of the injection molding apparatus 2 is the fully automatic operation mode or the semi-automatic operation mode based on the calculated amount of change in mold clamping force (S5 in FIG. 10A).

Then, the arithmetic unit 31 of the controller 15 checks whether the prediction result of the operation mode is the semi-automatic operation mode (S6 in FIG. 10A). This molding processing is based on the premise that the actual operation mode of the injection molding apparatus 2 is the fully automatic operation mode, therefore, it is possible to check whether or not the prediction result of the operation mode is the semi-automatic operation mode and the actual operation mode of the injection molding apparatus 2 is the fully automatic operation mode (S6). In this case (YES in S6), the arithmetic unit 31 of the controller 15 determines that an apparatus failure has occurred, and transmits a discharge signal indicating to that effect to the management server 5 and the molded article sorting device 4 through the communication I/F portion 37 (S7 in FIG. 10A).

The molded article (shot) ejected through the product ejecting step (P5) is conveyed to the molded article sorting device 4 by a conveyance device (not shown). The controller 26 of the molded article sorting device 4 controls the molded article sorter 25 and sorts molded articles into non-defective articles and defective articles. At this time, the molded article sorting device 4 sorts out a molded article (shot) corresponding to the discharge signal as a defective article from other non-defective articles. There is a high possibility that a defective article (defective molded article) is mixed in molded articles molded by the injection molding apparatus 2 in which a failure has occurred. Therefore, by detecting a failure of the injection molding apparatus 2, eventually, occurrence of a defective article in the injection molding apparatus 2 can be detected. That is, in detection of an apparatus failure by the arithmetic unit 31 (determination unit), molding of a defective article by the injection molding apparatus 2 is also detected at the same time. By sorting out a molded article corresponding to the discharge signal as a defective article, a defective article can be accurately prevented from mixing into non-defective articles.

After the product ejecting step (P5 in FIG. 4), one cycle of molding processing ends.

Then, in a case where the actual operation mode is the fully automatic operation mode and molding processing is continued (YES in S10 in FIG. 10A), the arithmetic unit 31 returns the process in FIG. 10A to S1 again, and starts next one cycle of molding processing.

On the other hand, in a case where the actual operation mode of the injection molding apparatus 2 is the semi-automatic operation mode, or molding processing is not continued (NO in S10 in FIG. 10A), the molding processing by the injection molding apparatus 2 ends.

Figure 10B:
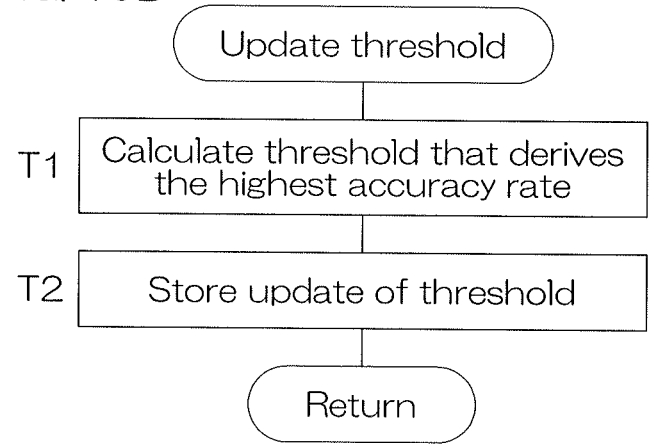
FIG. 10B is a flowchart for setting an update of a threshold in a threshold storage portion.

At predetermined timings, the threshold in the threshold storage portion 35 is updated. FIG. 10B is a flowchart for setting an update of the threshold in the threshold storage portion 35.

In this preferred embodiment, the threshold in the threshold storage portion 35 is updated, for example, once a day (for example, at a predetermined time, etc.). However, the threshold may be updated every several days, weekly, or monthly. As shown in FIG. 10B, the arithmetic unit 31 of the controller 15 calculates a threshold that derives the highest accuracy rate by using the technique shown in FIG. 8 and FIG. 9 (T1 in FIG. 10B), and stores this threshold as an update in the threshold storage portion 35 of the storage unit 32 (T2 in FIG. 10B). In the molding processing after threshold updating, it is possible to predict an actual operation mode of the injection molding apparatus 2 by using the updated threshold.

As above, according to this preferred embodiment, by comparing the calculated amount of change in mold clamping force and the threshold, an operation mode of the injection molding apparatus 2 can be highly accurately predicted. Then, in a case where the actual operation mode of the injection molding apparatus 2 is the fully automatic operation mode, and the highly accurately predicted operation mode is the semi-automatic operation mode, it is determined that an apparatus failure of the injection molding apparatus 2 has occurred.

That is, conventionally, an operation state of the injection molding apparatus 2 has been considered to be good in the automatic operation mode. In such a state, by detecting a failure (abnormality) in a case where the predicted operation mode is the semi-automatic operation mode, an apparatus failure that had been conventionally unnoticed can be highly accurately detected.

Conventionally, unless abnormal noise or vibration apparently appeared from an injection molding apparatus (including a mold clamping device), occurrence of a failure in the injection molding apparatus could not be detected. Even a person of experience could not detect a failure (abnormality), etc., caused by aging deterioration, etc., of the injection molding apparatus (including the mold clamping device) at the stage before abnormal noise or vibration apparently appears. That is, occurrence of a failure in the injection molding apparatus could not be detected early.

Even when the injection molding apparatus is stopped at the stage where abnormal noise and/or vibration apparently appears from the injection molding apparatus, at that time point, a severity of the failure (abnormality) of the injection molding apparatus has already increased, and in many cases, this leads to a situation in which the operation of the injection molding apparatus has to be stopped for a long period of time for a repair, etc.. That is, there is a concern that a response consequently delays and leads to a remarkable decrease in productivity.

With the technique of detecting a failure (abnormality) of the injection molding apparatus 2 based on an amount of change in mold clamping force as in the present preferred embodiment, a failure (abnormality) of the injection molding apparatus 2 can be detected at an early stage where abnormal noise and/or vibration does not apparently appear. Specifically, this technique can be utilized for detection of an early failure, etc., of the mold clamping device 10 of the injection molding apparatus 2. Such early failures include a failure of the mold clamping mechanism 11 (for example, failure of the first servo motor 20, wear of the connection portion of the toggle arm 22, flaking of the ball screw 19, etc.) and/or an abnormality (for example, abnormal wear) of the mold 13, etc., by way of example.

Also, a molded article (shot) suspected to be a defective article can be accurately sorted out from non-defective articles, therefore, even a molding defective article having defects that are normally difficult to find unless visually checked, such as short shot, sink marks and burrs can also be accurately sorted out. As a result, man-hours for product inspection can be reduced.

Next, a second preferred embodiment is described. The second preferred embodiment is the same molding system 1 as in the first preferred embodiment. The second preferred embodiment is different from the first preferred embodiment in control content (the technique of detecting an apparatus failure).

FIG. 11 is a flowchart showing a flow of molding processing to be executed in the injection molding apparatus 2 according to the second preferred embodiment.

In the injection molding apparatus 2, in a case where one cycle of molding processing (second molding processing) is fully automatically operated, after the start (S11) of one cycle of molding processing (first molding processing), first, the mold clamping step (P1 in FIG. 4) is executed. After the end of the mold clamping step (P1), the controller 15 executes other steps (P2 to P5 in FIG. 4) of the molding processing in order.

The actual operation mode acquisition portion 34 of the controller 15 stores an actual operation mode of the injection molding apparatus 2 at the time of execution of the mold clamping step (P1) in the operation status history 36 of the storage unit 32 (S13). Also, the arithmetic unit 31 of the controller 15 calculates an amount of change in mold clamping force based on the Equation (1), and stores the calculated amount of change in mold clamping force in the operation status history 36 of the storage unit 32 of the controller 15 (S14).

Also, the arithmetic unit 31 of the controller 15 predicts whether the operation mode of the injection molding apparatus 2 is the fully automatic operation mode or the semi-automatic operation mode based on the calculated amount of change in mold clamping force (S15). The respective steps of S11 to S15 are equivalent to the respective steps of S1 to S5 (FIG. 10A).

After the product ejecting step (P5 in FIG. 4), one cycle of the molding processing (second molding processing) ends.

Thereafter, in a case where the actual operation mode of the injection molding apparatus 2 is the fully automatic mode, and the molding processing (second molding processing) is continued (YES in S21), the arithmetic unit 31 of the controller 15 returns the process in FIG. 11 to S11 again, and starts next one cycle of molding processing (second molding processing).

On the other hand, in a case where the actual operation mode of the injection molding apparatus 2 is the semi-automatic operation mode or the molding processing is not continued (NO in S21), the molding processing by the injection molding apparatus 2 ends.

The arithmetic unit 31 of the controller 15 calculates a threshold (determination value), for example, once a day (for example, at a predetermined time, etc.) based on whether or not an operation mode predicted based on an amount of change in mold clamping force in a past predetermined period (for example, in a past one day (24 hours)) matches the actual operation mode (whether or not the prediction result of the operation mode prediction is correct).

Figure 12:
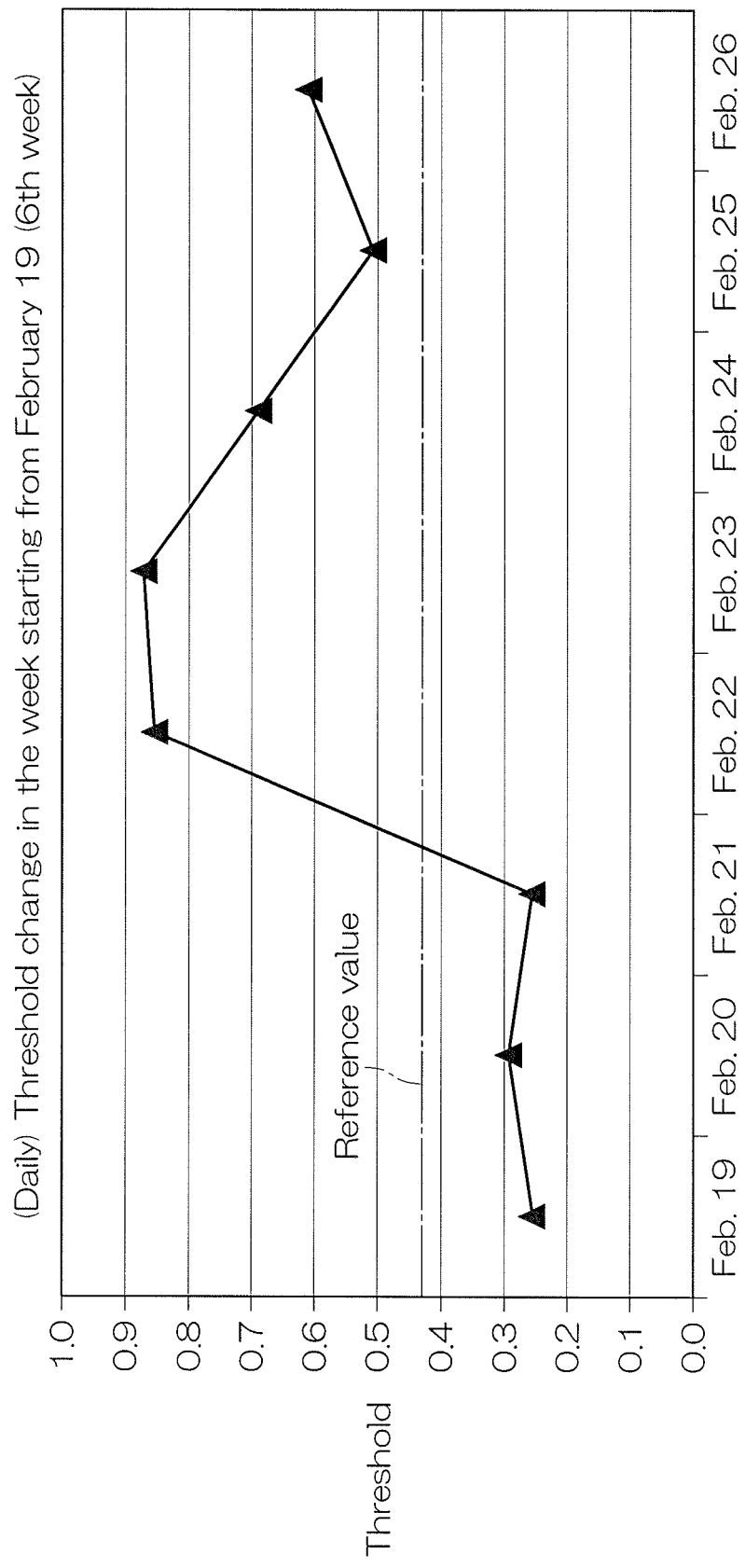
FIG. 12 is a diagram showing results of a molding test.

Specifically, by using the technique described with reference to FIG. 4 to FIG. 9 (in particular, the technique described with reference to FIG. 8 and FIG. 9), the arithmetic unit 31 calculates a threshold (determination value) that derives the highest accuracy rate, and compares the calculated threshold (determination value) and a predetermined reference value (reference value is illustrated by an alternate long and short dashed line in FIG. 12) stored in the storage unit 32. This reference value may be set to be slightly higher than, for example, a mean value of thresholds (determination values) calculated in a case where the injection molding apparatus 2 is normal. More specifically, this reference value may be set to approximately 1.5 times the mean value of such thresholds (determination values) as shown in FIG. 12. Also, whether or not the threshold (determination value) exceeds the reference value may be determined every several days, weekly, or monthly. Also, the past predetermined period is not limited to one day (24 hours), and may be several days or several weeks. Alternatively, it may be several hours. However, it is desirable that both of the fully automatic operation mode and the semi-automatic operation mode appear at some degree of appearance ratio, therefore, the past predetermined period is preferably one day or more.

Also, in this second preferred embodiment, as a weighting filter to be used to correct (smooth) a quadruple maximum mold clamping force, a weighting filter different from that in the case of the first preferred embodiment may be used.

With a weighting filter preferred for the second preferred embodiment, a quadruple maximum mold clamping force after correction is calculated by applying the weighting filter to a total of five data including a quadruple maximum mold clamping force at an arithmetic target time point, a quadruple maximum mold clamping force at a time point immediately previous to the arithmetic target time point (hereinafter, may be referred to as "immediately previous quadruple maximum mold clamping force"), a quadruple maximum mold clamping force at a time point two before the arithmetic target time point (hereinafter, may be referred to as "two-before quadruple maximum mold clamping force), a quadruple maximum mold clamping force at a time point next to the arithmetic target time point (hereinafter, may be referred to as "next quadruple maximum mold clamping force"), and a quadruple maximum mold clamping force at a time point two ahead of the arithmetic target time point (hereinafter, may be referred to as "two-ahead quadruple maximum mold clamping force").

For example, a case where a value of the quadruple maximum mold clamping force at the arithmetic target time point is "1528," a value of the immediately previous quadruple maximum mold clamping force is "1520," a value of the two-before quadruple maximum mold clamping force is "1518," a value of the next quadruple maximum mold clamping force is "1523," and a value of the two-ahead quadruple maximum mold clamping force is "1526" is considered. In this case, a value of the quadruple maximum mold clamping force after correction is ((1528×6)+(1520×4)+1518+(1523×4)+1526)/16, that is, 1524. Such a weighting filter is used in order to calculate the threshold (determination value) not in parallel with molding processing but at a predetermined timing.

Then, in a case where the calculated threshold (determination value) is higher than the stored reference value, the arithmetic unit 31 of the controller 15 determines that an apparatus failure has occurred, and transmits an abnormality signal indicating to that effect to the management server 5 and the molded article sorting device 4 through the communication I/F portion 37.

As above, according to the second preferred embodiment, in a case where the calculated threshold (determination value) is higher than the stored reference value, an apparatus failure of the injection molding apparatus 2 is detected. As in the case of the first preferred embodiment, an apparatus failure that had been conventionally unnoticed can be more highly accurately detected also in the case of the second preferred embodiment. Other actions and effects obtained in relation to the first preferred embodiment can also be obtained in the second preferred embodiment.

<Molding Test>

A molding test is described.

With regard to the injection molding apparatus 2 according to the second preferred embodiment, daily changes in threshold (determination value) (threshold (determination value) calculated in the molding processing that derives the highest accuracy rate were observed. Results of this molding test are shown in FIG. 12.

It can be understood from FIG. 12 that there was a surge in the threshold (determination value) from February 21 to February 22. Thereafter, on February 26, a failure occurred in the injection molding apparatus 2 observed in this molding test. From FIG. 12, it was found that a sign of a failure could be detected based on a change in the calculated threshold (determination value).

Figure 13:
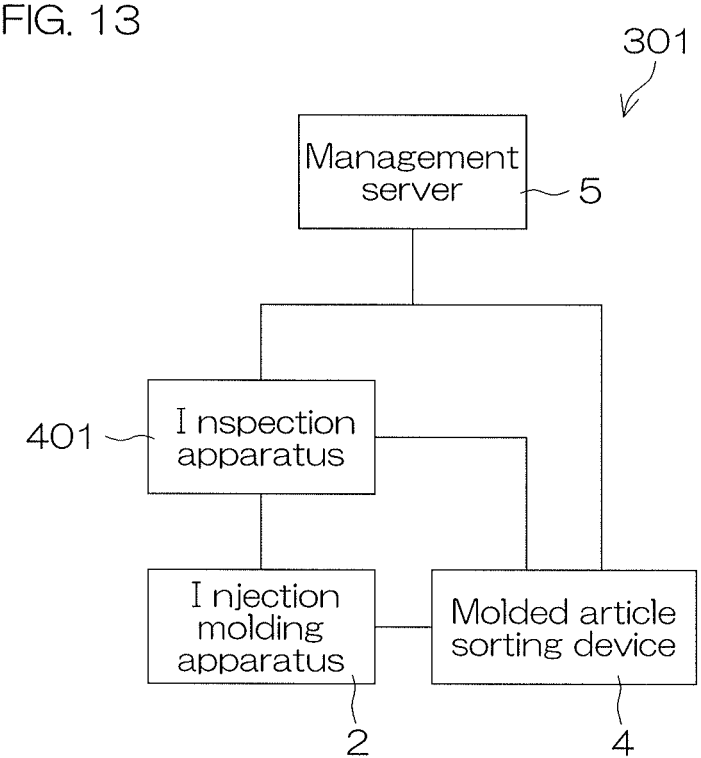
FIG. 13 is a diagram showing a molding system according to a third preferred embodiment.
Figure 14:
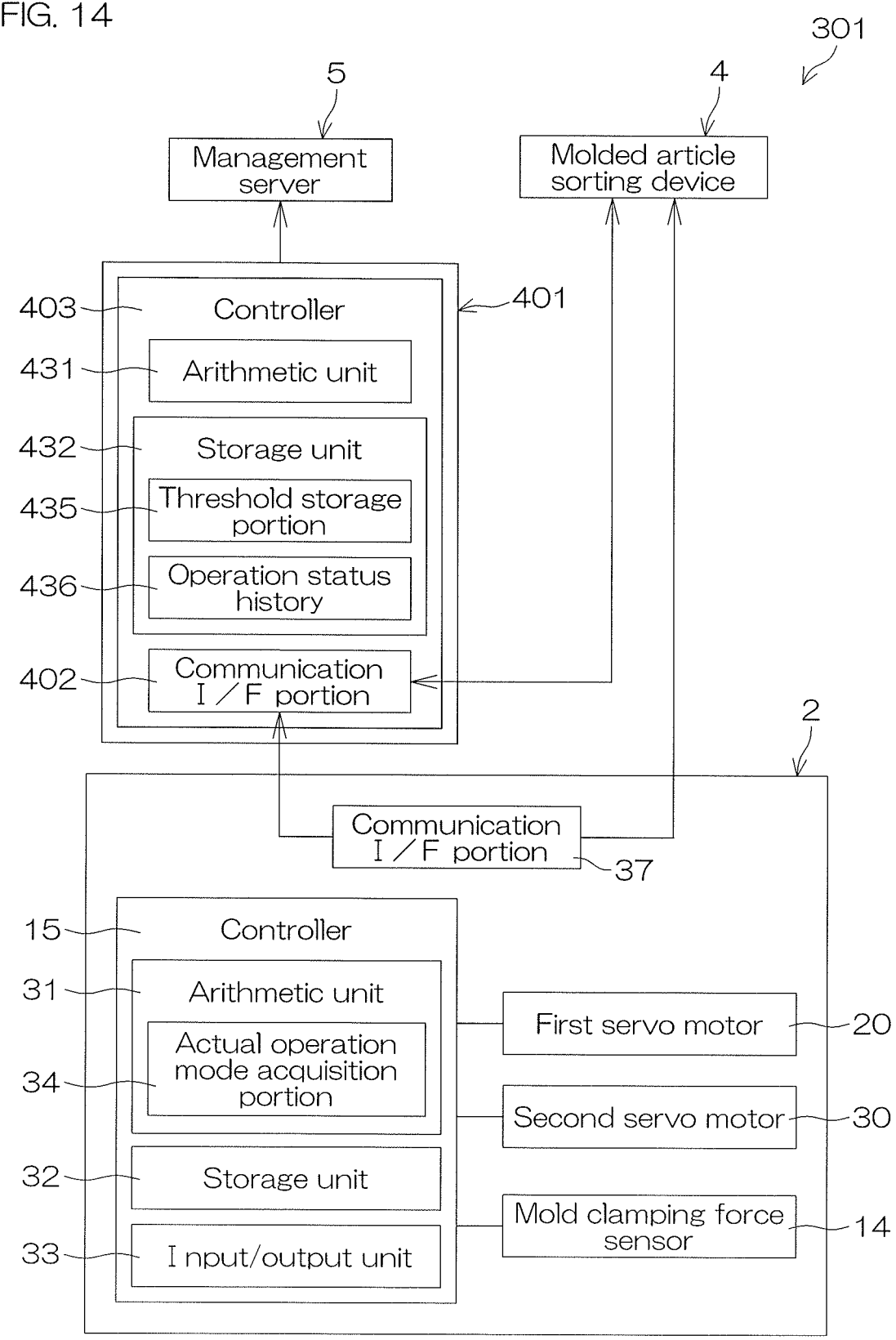
FIG. 14 is a block diagram showing an electrical configuration of the molding system.

FIG. 13 is a diagram showing a molding system 301 according to a third preferred embodiment. FIG. 14 is a block diagram showing an electrical configuration of the molding system 301. In the third preferred embodiment, parts corresponding to respective portions shown in the first preferred embodiment are provided with the same reference signs as in the cases of FIG. 1 to FIG. 12, and descriptions thereof are omitted.

The molding system 301 detects an apparatus failure of the injection molding apparatus 2 not in the injection molding apparatus 2 but by using an inspection apparatus 401 externally attached to the injection molding apparatus 2. A configuration of the injection molding apparatus 2 according to the third preferred embodiment is substantially equivalent to that of the injection molding apparatus 2 (refer to FIG. 3A) according to the first and second preferred embodiments. However, in the third preferred embodiment, the threshold storage portion 35 (refer to FIG. 3A) and the operation status history 36 (refer to FIG. 3A) may be omitted. The inspection apparatus 401 is interposed between the injection molding apparatus 2 to be inspected and the management server 5 in the example shown in FIG. 13.

The inspection apparatus 401 includes a communication I/F (interface) portion 402 for communicating with the injection molding apparatus 2 to be inspected and the management server 5 and a controller 403. The inspection apparatus 401 has a function as a data acquisition device to acquire various information from the injection molding apparatus 2 to be inspected, and a function as a detection unit to detect an apparatus failure of the injection molding apparatus 2 based on the acquired data. In this preferred embodiment, the inspection apparatus 401 is realized by one device, however, it may be configured by a plurality of devices separated from each other. For example, the data acquisition device and the detection unit may be respectively configured by different devices. In this case, the detection unit may be realized by a personal computer.

The controller 403 is configured by using a microcomputer (computer).

The controller 403 includes an arithmetic unit 431 such as a CPU, a storage unit 432, and an input/output unit 433 (for example, RS232C; not shown).

The storage unit 432 is configured by using a fixed memory device (not shown), a hard disk drive, etc. The storage unit 432 includes a threshold storage portion 435 that stores a threshold to be used for prediction of an operation mode of the injection molding apparatus 2 and an operation status history 436 for storing histories of an operation status in the injection molding apparatus 2 to be inspected. Content in the operation status history 436 is equivalent to the content in the operation status history 36 (refer to FIG. 10B).

In the third preferred embodiment, the inspection apparatus 401 is configured to be able to acquire, from the injection molding apparatus 2, a mold clamping force detected at an operation time of the injection molding apparatus 2 and an actual operation mode at the operation time (operation mode judged by the actual operation mode acquisition portion 34).

The arithmetic unit 431 of the controller 403 predicts whether the operation mode of the injection molding apparatus 2 is the fully automatic operation mode or the semi-automatic operation mode based on a mold clamping force acquired from the injection molding apparatus 2. With this third preferred embodiment, the arithmetic unit 431 realizes an operation. mode prediction mut that predicts whether the operation mode of the injection molding apparatus 2 is the fully automatic operation mode or the semi-automatic operation mode. A technique of predicting the operation mode is equivalent to that in the case of the first preferred embodiment, and description thereof is omitted.

Also, the arithmetic unit 431 determines that an apparatus failure (a failure of the injection molding apparatus 2 including the mold clamping device 10) has occurred in a case where the actual operation mode of the injection molding apparatus 2 is the fully automatic operation mode and a predicted operation mode is the semi-automatic operation mode. In the third preferred embodiment, the arithmetic unit 431 realizes a determination unit that determines that an apparatus failure has occurred.

In the third preferred embodiment, an inspection by the inspection apparatus 401 is conducted in parallel with one cycle of molding processing of the injection molding apparatus 2. Hereinafter, a specific description is given.

In a case where one cycle of molding processing is fully automatically operated in the injection molding apparatus 2, after the start of one cycle of molding processing, the mold clamping step (P1 in FIG. 4) is executed. After the end of the mold clamping step (P1), the controller 15 of the injection molding apparatus 2 executes other steps (P2 to P5 in FIG. 4) of the molding processing in order. The controller 403 of the inspection apparatus 401 acquires, from the injection molding apparatus 2, an actual operation mode of the injection molding apparatus 2 at the time of execution of the mold clamping step (P1) acquired by the actual operation mode acquisition portion 34 of the controller 15. Also, the controller 403 acquires a mold clamping force (maximum mold clamping force) detected by the mold clamping force sensor 14 at the time of execution of the mold clamping step (P1) from the injection molding apparatus 2. The arithmetic unit 431 of the controller 403 stores the acquired actual operation mode and mold clamping force (maximum mold clamping force) in the operation status history 436 of the storage unit 432. Also, the arithmetic unit 431 of the controller 403 calculates an amount of change in mold clamping force based on the Equation (1), and stores the calculated amount of change in mold clamping force in the operation status history 36 of the storage unit 432.

Also, the arithmetic unit 431 of the controller 403 predicts whether the operation mode of the injection molding apparatus 2 is the fully automatic operation mode or the semi-automatic operation mode based on the calculated amount of change in mold clamping force.

Then, the arithmetic unit 431 of the controller 403 checks whether or not the prediction result of the operation mode is the semi-automatic operation mode, that is, whether or not the prediction result of the operation mode is the semi-automatic operation mode and the actual operation mode of the injection molding apparatus 2 is the fully automatic operation mode. In a case where the prediction result of operation mode is the semi-automatic operation mode, the arithmetic unit 431 of the controller 403 determines that an apparatus failure has occurred, and transmits an abnormality signal indicating to that effect to the management server 5 through the communication I/F portion 402. Further, the arithmetic unit 431 of the controller 403 transmits a discharge signal indicating to that effect to the molded article sorting device 4 through the communication I/F portion 402.

The threshold in the threshold storage portion 435 is updated at a predetermined timing. In this preferred embodiment, the threshold in the threshold storage portion 435 is updated, for example, once a day (for example, at a predetermined time, etc.). However, the threshold may be updated every several days, weekly, or monthly. The arithmetic unit 431 of the controller 403 calculates a threshold that derives the highest accuracy rate by using the technique shown in FIG. 8 and FIG. 9, and stores this threshold as an update in the threshold storage portion 435 of the storage unit 432 (technique equivalent to the method shown in the case of FIG. 10B). In the molding processing after threshold updating, an actual operation mode of the injection molding apparatus 2 is predicted by using the updated threshold.

As above, according to the third preferred embodiment, by comparing the calculated amount of change in mold clamping force and the threshold, an operation mode of the injection molding apparatus 2 can be highly accurately predicted. Then, in a case where the actual operation mode of the injection molding apparatus 2 is the fully automatic operation mode, and the highly accurately predicted operation mode is the semi-automatic operation mode, it is determined by the inspection apparatus 401 that an apparatus failure of the injection molding apparatus 2 has occurred. Occurrence of an apparatus failure in the injection molding apparatus 2 can thereby be highly accurately inspected by the inspection apparatus 401 (inspection method). By this technique, an early failure, etc., of the mold clamping device 10 of the injection molding apparatus 2 can be highly accurately detected by the inspection apparatus 401. Other actions and effects obtained in relation to the first preferred embodiment can also be obtained in the third preferred embodiment.

Although three preferred embodiments of the present invention are described above, the present invention can be carried out in yet other preferred embodiments.

For example, the second preferred embodiment and the third preferred embodiment can be combined. That is, it may be configured such that an apparatus failure of the injection molding apparatus 2 is detected by the inspection apparatus 401 in a case where a threshold (determination value) calculated for prediction of an operation mode is higher than the stored reference value.

In the first and second preferred embodiments, it may be configured such that the controller 23 of the management server 5 detects an apparatus failure, etc., of the injection molding apparatus 2 based on information transmitted from the injection molding apparatus 2 (various information stored in the operation status history 36). That is, the detection unit to detect an apparatus failure, etc., of the injection molding apparatus 2 may be realized by the management server 5. In this case, it may be configured such that, in the first preferred embodiment, the controller 23 of the management server 5 transmits, based on this detection, a discharge signal to discharge a molded article (shot) to the molded article sorting device 4, and the molded article sorting device 4 may sort out a defective article from other non-defective articles based on this discharge signal.

Further, in the first and second preferred embodiments, in another computer capable of communicating with the management server 5 and/or the injection molding apparatus 2 through a communication line, a detection unit to detect an apparatus failure, etc., of the injection molding apparatus 2 may be realized.

In the third preferred embodiment, in another computer capable of communicating with the inspection apparatus 401 through a communication line, a detection unit to detect (inspect) an apparatus failure, etc., of the injection molding apparatus 2 may be realized. That is, a configuration in which a detection unit is provided so as to be capable of communicating with a data acquisition device may be employed.

In the first to third preferred embodiments, in determination of an apparatus failure, several shots immediately after the operation mode switches from the semi-automatic operation mode d1 to the fully automatic operation mode d2 (shots represented by "d3" in FIG. 8) may be excluded from shots in a case where the actual operation mode is the fully automatic operation mode d2. In "d3" shots, the amount of change in mold clamping force exhibits an unstable behavior although the actual operation mode is the fully automatic operation mode d2. Therefore, by excluding "d3" shots from shots of the fully automatic operation mode d2, an apparatus failure (that is, determination as FP in FIG. 9 (when the actual operation mode is the fully automatic operation mode and the prediction result is the semi-automatic operation mode)) is determined based on shots during a period of stable operation (shots represented by "d4"+"d5" in FIG. 8). An apparatus failure can thereby be more highly accurately determined.

It may be configured such that, in determination of an apparatus failure, several shots immediately before the operation mode switches from the fully automatic operation mode d2 to the semi-automatic operation mode d1 (shots represented by "d4" in FIG. 8) are further excluded from shots in a case where the actual operation mode is the fully automatic operation mode d2. In these "d4" shots, the amount of change in mold clamping force sometimes exhibits an unstable behavior although it is relatively stable. Therefore, by excluding "d4" shots from shots of the fully automatic operation mode d2 also to "d3," an apparatus failure is determined based on shots (shots represented by "d5" in FIG. 8) during a period of most stable operation in the fully automatic operation mode d2. An apparatus failure can thereby be further highly accurately determined.

In the first and second preferred embodiments, in place of/also to sorting out of a defective article corresponding to an apparatus failure from other non-defective articles by the molded article sorting device 4, based on detection of the apparatus failure, an operator may be informed of warning by a warning sound and/or a warning lamp from a warning unit 501 (shown by a dashed line in FIG. 3A) provided in the injection molding apparatus 2.

In particular, it may be configured such that, a case where a shot in which an apparatus failure is detected (that is, in a case where FP in FIG. 9 (when the actual operation mode is the fully automatic operation mode, and the prediction result is the semi-automatic operation mode) is determined) continues for a predetermined number (for example, 10 shots), or a case where the percentage of shots in which an apparatus failure is detected exceeds a predetermined percentage (for example, 50%) in a predetermined period is defined as a severe apparatus failure, and the warning unit

501 issues a warning. In this case, a severe failure has occurred in the injection molding apparatus 2 (including the mold clamping device 10).

Also, it may be configured such that a warning unit provided outside the injection molding apparatus 2 gives a warning to an operator, etc., based on detection of an apparatus failure. The warning unit in this case may include, for example, a rotating light, etc. In this case, it may be configured such that, based on detection of an apparatus failure, the arithmetic unit 31 of the controller 15 transmits an abnormality signal to the management server 5 and the warning unit through the communication I/F portion 37.

In the first and second preferred embodiments, the mold clamping force sensor 14 may be externally attached to the injection molding apparatus 2.

In the third preferred embodiment, the mold clamping force sensor 14 may be externally attached to the injection molding apparatus 2. In this case, the mold clamping force sensor 14 may be included in the inspection apparatus 401.

In the first to third preferred embodiments, the molding system 1 does not have to include the management server 5.

A configuration in which the threshold is set by automatic updating is described in the first and third preferred embodiments, however, it may be configured such that the threshold is set by manual updating by an operator by using the threshold calculated as described above. Alternatively, the threshold does not have to be updated.

In the first to third preferred embodiments, the injection molding apparatus 2 may further include, as operation modes, other modes also to the two operation modes of the fully automatic operation mode and the semi-automatic operation mode.

In the first to third preferred embodiments, the mold clamping mechanism of the injection molding apparatus 2 may be not a toggle type but another type (for example, a direct pressure type).

As a molding apparatus of the present preferred embodiment, without limiting to the injection molding apparatus, the present invention is also applicable to other molding apparatuses that include the mold clamping device 10, for example, a press molding apparatus, etc.

While preferred embodiments of the present invention have been described in detail above, these are merely detailed examples used to clarify the technical content of the present invention, and the present invention should not be interpreted as being limited to these specific examples, and the scope of the present invention is limited only by the appended claims.

This application corresponds to Japanese Patent Application No. 2017-98008 filed in the Japan Patent Office on May 17, 2017 and Japanese Patent Application No. 2017-150311 filed in the Japan Patent Office on Aug. 3, 2017, and the entire disclosures of these applications are incorporated herein by reference.

REFERENCE SIGNS LIST

1: Molding system
2: Injection molding apparatus
4: Molded article sorting device
5: Management server
10: Mold clamping device
11: Mold clamping mechanism
13: Mold
14: Mold clamping force sensor
15: Controller
31: Arithmetic unit
32: Storage unit
34: Actual operation mode acquisition portion
35: Threshold storage portion
36: Operation status history
301: Molding system
401: inspection apparatus
403: Controller
431: Arithmetic unit
432: Storage unit
435: Threshold storage portion
436: Operation status history

The invention claimed is:

1. A molding system including a molding apparatus that is provided with a mold provided so as to be openable and closable and a mold clamping mechanism to apply a mold clamping force to the mold, comprising:
   a mold clamping force sensor for detecting a mold clamping force generated in the mold;
   a detection unit for detecting an apparatus failure of the molding apparatus and/or molding of a defective article by the molding apparatus based on an amount of change in mold clamping force detected by the mold clamping force sensor;
   an operation mode prediction unit for predicting, based on an amount of change in mold clamping force detected by the mold clamping force sensor, which of a plurality of operation modes including a fully automatic operation mode and a semi-automatic operation mode the operation mode of the molding apparatus is; and
   an actual operation mode acquisition unit for acquiring, without relying on the mold clamping force sensor, in operation of the molding apparatus, which of the plurality of operation modes the actual operation mode of the molding apparatus is, wherein
   the detection unit includes a determination unit for determining that the apparatus failure has occurred and/or the molding of a defective article has occurred in a case where an actual operation mode of the molding apparatus is the fully automatic operation mode, and an operation mode predicted by the operation mode prediction unit is the semi-automatic operation mode.

2. The molding system according to claim 1, wherein the operation mode prediction unit includes a unit for predicting an operation mode of the molding apparatus by comparing an amount of change in mold clamping force detected by the mold clamping force sensor and a set predetermined threshold.

3. The molding system according to claim 2, further comprising:
   a calculation unit for calculating a value based on whether or not an operation mode predicted by the operation mode prediction unit matches an actual operation mode acquired by the actual operation mode acquisition unit; and
   a unit for setting a value calculated by the calculation unit as the threshold.

4. An inspection apparatus to inspect a molding apparatus that is provided with a mold provided so as to be openable and closable and a mold clamping mechanism to apply a mold clamping force to the mold, comprising:
   a detection unit for detecting the apparatus failure of the molding apparatus and/or molding of a defective article by the molding apparatus based on an amount of change in mold clamping force detected by a mold clamping force sensor for detecting a mold clamping force generated in the mold;

an operation mode prediction unit for predicting, based on an amount of change in mold clamping force detected by the mold clamping force sensor, which of a plurality of operation modes including a fully automatic operation mode and a semi-automatic operation mode the operation mode of the molding apparatus is; and an actual operation mode acquisition unit for acquiring, without relying on the mold clamping force sensor, in operation of the molding apparatus, which of the plurality of operation modes the actual operation mode of the molding apparatus is, wherein the detection unit includes a determination unit for determining that the apparatus failure has occurred and/or the molding of a defective article has occurred in a case where an actual operation mode of the molding apparatus is the fully automatic operation mode, and an operation mode predicted by the operation mode prediction unit is the semi-automatic operation mode.

5. An inspection method for inspecting a molding apparatus that is provided with a mold provided so as to be openable and closable and a mold clamping mechanism to apply a mold clamping force to the mold, comprising:

a mold clamping force detecting step of detecting, by a mold clamping force sensor, a mold clamping force generated in the mold;

a detecting. step of detecting the apparatus failure of the molding apparatus and/or molding of a defective article by the molding apparatus based on an amount of change in Mold clamping force detected by the mold clamping force sensor;

an operation mode prediction step of predicting, based on an amount of change in Mold clamping force detected by the mold clamping force sensor, which of a plurality of operation modes including a fully automatic operation mode and a semi-automatic operation mode the operation mde of the molding apparatus is; and an actual operation mode acquisition step of acquiring, without relying on the mold clamping force sensor, in operation of the molding apparatus, which of the plurality of operation modes the actual operation mode of the molding apparatus is, wherein the detection step includes a determination step of determining that the apparatus failure has occurred and/or the molding of a defective article has occurred in a case where an actual operation mode of the molding apparatus is the fully automatic operation mode, and an operation mode predicted in the operation mode prediction step is the semi-automatic operation mode.

* * * * *